US010985621B2

(12) United States Patent
Yamagata et al.

(10) Patent No.: US 10,985,621 B2
(45) Date of Patent: Apr. 20, 2021

(54) MOLDED MOTOR

(71) Applicant: Panasonic Intellectual Property Management Co., Ltd., Osaka (JP)

(72) Inventors: Yoshikazu Yamagata, Osaka (JP); Akihiko Watanabe, Osaka (JP); Takanori Amaya, Osaka (JP); Yasuo Nanbu, Osaka (JP); Hisaaki Kato, Osaka (JP); Yasunori Wakamori, Osaka (JP); Masayuki Taniguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 127 days.

(21) Appl. No.: 16/484,761

(22) PCT Filed: Feb. 26, 2018

(86) PCT No.: PCT/JP2018/006978
§ 371 (c)(1),
(2) Date: Aug. 8, 2019

(87) PCT Pub. No.: WO2018/159537
PCT Pub. Date: Sep. 7, 2018

(65) Prior Publication Data
US 2020/0006991 A1  Jan. 2, 2020

(30) Foreign Application Priority Data

Feb. 28, 2017 (JP) .............................. JP2017-037229

(51) Int. Cl.
*H02K 11/40* (2016.01)
*H02K 1/04* (2006.01)
(Continued)

(52) U.S. Cl.
CPC ............... *H02K 1/04* (2013.01); *H02K 1/146* (2013.01); *H02K 1/276* (2013.01); *H02K 1/278* (2013.01);
(Continued)

(58) Field of Classification Search
CPC .......... H02K 1/04; H02K 1/146; H02K 1/276; H02K 1/278; H02K 5/04; H02K 5/02;
(Continued)

(56) References Cited

U.S. PATENT DOCUMENTS 9,071,090 B2 *  6/2015  Watanabe .............. H02K 7/083
9,853,406 B2 * 12/2017  Jang ....................... H02K 11/40
(Continued)

FOREIGN PATENT DOCUMENTS

CN    102859845 A    1/2013
CN    103814506 A    5/2014
(Continued)

OTHER PUBLICATIONS

International Search Report of PCT application No. PCT/JP2018/006978 dated May 22, 2018.
(Continued)

*Primary Examiner* — Maged M Almawri
(74) *Attorney, Agent, or Firm* — McDermott Will & Emery LLP

(57) ABSTRACT

A molded motor of the present invention includes a rotor, a stator, a pair of shaft bearings, a pair of metal brackets, and a molding resin. The rotor has: a rotary shaft extending in a shaft direction; and a rotary body that has a permanent magnet and is fixed to the rotary shaft. The stator has: a stator core on which a plurality of salient poles are formed; and a plurality of coils each wound on each salient pole via an insulator, where the stator is covered by the molding resin and is disposed to face the rotor. The pair of metal brackets
(Continued)

each fix each of the shaft bearings, and the shaft bearings rotatably support the rotor. Further, the rotary body has a dielectric layer formed between the rotary shaft and an outer peripheral surface of the rotary body. A metal member is provided, on an outer peripheral side of a coil end of the coil and on at least a part facing the coil end, in a circumferential direction.

29 Claims, 24 Drawing Sheets

(51) Int. Cl.
  *H02K 1/14* (2006.01)
  *H02K 1/27* (2006.01)
  *H02K 5/173* (2006.01)
  *H02K 7/08* (2006.01)
  *H02K 21/16* (2006.01)
  *H02K 5/136* (2006.01)
  *H02K 5/08* (2006.01)
  *H02K 5/02* (2006.01)

(52) U.S. Cl.
  CPC ............... *H02K 5/02* (2013.01); *H02K 5/08* (2013.01); *H02K 5/136* (2013.01); *H02K 5/1732* (2013.01); *H02K 7/083* (2013.01); *H02K 21/16* (2013.01); *H02K 11/40* (2016.01)

(58) Field of Classification Search
  CPC ........ H02K 5/08; H02K 5/136; H02K 5/1732; H02K 7/083; H02K 21/16; H02K 11/40
  USPC .......................................... 310/43–45, 88, 89
  See application file for complete search history.

(56) References Cited

U.S. PATENT DOCUMENTS

| | | | | |
|---|---|---|---|---|
| 10,250,109 | B2 * | 4/2019 | Yamada | H02K 5/08 |
| 10,326,323 | B2 * | 6/2019 | Bhargava | H02K 1/30 |
| 10,855,134 | B2 * | 12/2020 | Ishii | F24F 1/0018 |
| 10,897,167 | B2 * | 1/2021 | Bhargava | H02K 21/12 |
| 2005/0073204 | A1 * | 4/2005 | Puterbaugh | H02K 5/10 |
| | | | | 310/89 |
| 2005/0280320 | A1 * | 12/2005 | Utsumi | H02K 24/00 |
| | | | | 310/43 |
| 2008/0042499 | A1 * | 2/2008 | Okada | H02K 11/40 |
| | | | | 310/43 |
| 2011/0043071 | A1 * | 2/2011 | Mizukami | H02K 11/40 |
| | | | | 310/216.121 |
| 2012/0274157 | A1 | 11/2012 | Watanabe et al. | |
| 2013/0043748 | A1 * | 2/2013 | Mizukami | H02K 11/40 |
| | | | | 310/71 |
| 2014/0232216 | A1 * | 8/2014 | Yamada | H02K 11/00 |
| | | | | 310/43 |
| 2015/0180300 | A1 * | 6/2015 | Jang | H02K 11/33 |
| | | | | 310/90 |
| 2015/0180307 | A1 * | 6/2015 | Inuzuka | B25F 5/008 |
| | | | | 310/50 |
| 2015/0180315 | A1 * | 6/2015 | Takahashi | H02K 19/365 |
| | | | | 310/63 |
| 2015/0188372 | A1 * | 7/2015 | Yokota | H02K 3/34 |
| | | | | 310/43 |
| 2015/0188377 | A1 * | 7/2015 | Kim | F04B 35/04 |
| | | | | 310/156.38 |
| 2015/0188383 | A1 * | 7/2015 | Okada | H02K 5/1732 |
| | | | | 310/43 |
| 2015/0188385 | A1 * | 7/2015 | Hsia | H02K 5/1675 |
| | | | | 310/45 |

FOREIGN PATENT DOCUMENTS

| | | |
|---|---|---|
| CN | 105322673 A | 2/2016 |
| EP | 2983278 A1 | 2/2016 |
| JP | 3-003160 U | 1/1991 |
| JP | 7-298543 A | 11/1995 |
| JP | 10-051989 | 2/1998 |
| JP | 2004-143368 | 5/2004 |
| JP | 2007-159302 | 6/2007 |
| JP | 2009-118628 | 5/2009 |
| JP | 2010-158152 | 7/2010 |
| JP | 2013-081264 | 5/2013 |
| JP | 5254310 B | 8/2013 |
| JP | 5338641 B | 11/2013 |

OTHER PUBLICATIONS

Extended European Search Report dated Feb. 14, 2020 for the related European Patent Application No. 18760677.7.
English Translation of Chinese Search Report dated Oct. 12, 2020 for the related Chinese Patent Application No. 201880015143.6.

* cited by examiner

MOLDED MOTOR

CROSS-REFERENCE TO RELATED APPLICATIONS

This application is a U.S. national stage application of the PCT International Application No. PCT/JP2018/006978 filed on Feb. 26, 2018, which claims the benefit of foreign priority of Japanese patent application 2017-037229 filed on Feb. 28, 2017, the contents all of which are incorporated herein by reference.

TECHNICAL FIELD

The present invention relates to a molded motor whose stator is covered with a molding resin.

BACKGROUND ART

When a brushless DC motor is driven by an inverter using a pulse width modulation method (hereinafter, referred to as a "PWM method"), a neutral point potential of a winding wire is not zero. Therefore, a voltage difference occurs between an outer ring of a shaft bearing and an inner ring of the shaft bearing (hereinafter, this voltage difference is also referred to as a "shaft voltage"). There is a problem that if this shaft voltage exceeds a breakdown voltage of an oil film in the shaft bearing, a discharge occurs in the shaft bearing, whereby electrolytic corrosion occurs on the shaft bearing.

To prevent such electrolytic corrosion from occurring on the shaft bearing, PTL 1 discloses a measure in which a stator core and a metal bracket are electrically connected to each other. With this configuration, the stator core and the metal bracket are electrically connected to each other, and potentials of the stator core and the metal bracket are the same. Therefore, the shaft voltage can be low, and, as a result, it is possible to prevent the electrolytic corrosion on the shaft bearing.

On the other hand, there are known molded motors in which a stator is covered with a molding resin to lower noise and vibration. Regarding such molded motors, as the power output of the motor has been increased in recent years, heat generation in a coil wound on the stator core has increased; therefore, there arises a problem that the molding resin is thermally deteriorated.

To prevent such thermal deterioration of the molding resin, PTL 2 discloses a technique in which an epoxy resin containing filler having high thermal conductivity is used as the molding resin. This improves heat radiation performance of the molding resin and can thus prevent thermal deterioration.

However, in a case where an excessive current flows through the coil wound on the stator core for some reason and the coil generates heat and heats up to high temperatures, an insulator for insulating an outer peripheral surface of a conductive wire of the coil can melt, and a short-circuit can occur in the conductive wires of the coil. If the conductive wires are short-circuited and generate a spark, the spark can ignite a gas generated when insulating resin or the like provided between the coil and the stator core is heated by the spark. Further, in a case where the molding resin is thermally deteriorated due to the heat of the coil, and a crack or the like is created in the molding resin, the ignited fire can leak outside the motor through the cracked part.

CITATION LIST

Patent Literature

PTL 1; Unexamined Japanese Patent Publication No. 2007-159302
PTL 2: Unexamined Japanese Patent Publication No. 2004-143368

SUMMARY

A molded motor according to the present invention includes a rotor, a stator, a pair of shaft bearings, and a molding resin.

The rotor has: a rotary shaft extending in a shaft direction; and a rotary body that has a permanent magnet and is fixed to the rotary shaft. A rotary shaft extending in a shaft direction may be written as a rotary shaft extending in a shaft direction The stator has: a stator core on which a plurality of salient poles are formed; and a plurality of coils each wound on each salient pole via an insulator. The stator is covered with the molding resin and is disposed to face the rotor.

The pair of shaft bearings rotatably support the rotor.

Further, the rotary body has a dielectric layer formed between the rotary shaft and an outer peripheral surface of the rotary body. Each of the plurality of coils has, as coil ends, parts protruding from the stator core toward the both sides in the shaft direction. In addition, in the molded motor, a metal member is provided, over a circumferential direction, on an outer peripheral side of the coil ends and on at least a part facing the coil ends.

The pair of shaft bearings each may be fixed to each of a pair of metal brackets. Alternatively, one of the pair of shaft bearings may be fixed to a metal bracket, and the other shaft bearing may be fixed to the molding resin.

In particular, the metal member may be located on an outer peripheral surface of the molding resin and on at least a part facing the coil end.

Alternatively, the metal member is located in the molding resin and on at least a part facing the coil end.

The present invention can provide a molded motor that can prevent electrolytic corrosion on a shaft bearing and that can prevent fire from leaking outside the motor even when, by any chance, an excessive current flows through the coil wound on the stator core.

DESCRIPTION OF PREFERRED EMBODIMENTS

Figure 1:
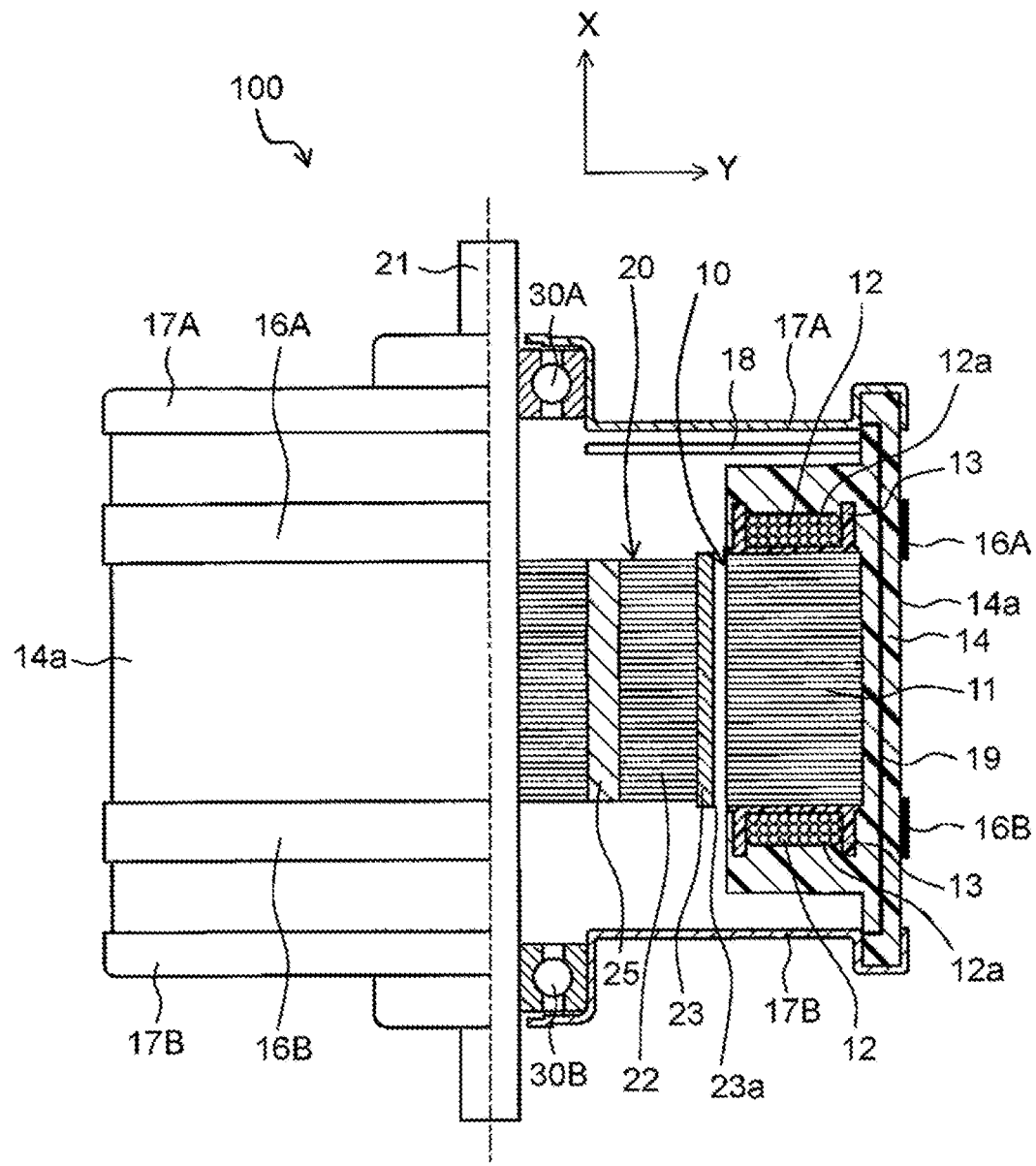
FIG. 1 is a half cross-sectional view schematically showing a configuration of a molded motor in a first exemplary embodiment of the present invention.

Before exemplary embodiments of the present invention are described, it will be described how the present invention has been conceived.

First, in the case of a brushless motor driven by a PWM inverter, a drive current is typically supplied to a coil of a stator by high-frequency switching based on a PWM method. Therefore, it is considered that the stator core causes electric and magnetic induction most strongly in the metal members surrounding the motor, where the coil is wound on the stator core, and a drive current is supplied to the coil. Then, high frequency signals are thus generated by such induction from the stator core, and the high frequency signals are transmitted to a shaft bearing and generate a shaft voltage; then, the shaft voltage causes electrolytic corrosion.

Further, in the molded motor, the stator side (outer ring side of the shaft bearing) has an insulating structure of the molding resin, and the stator side is therefore in a high-impedance state. On the other hand, the rotor side (inner ring side of the shaft bearing) does not have an insulating structure, and the rotor side is therefore in a low impedance state.

That is, in the above-mentioned structure of the molded motor in which the a brushless motor is resin-molded, when consideration is given to electric paths from the stator core, which is a generation source of the shaft voltage, to the shaft bearing, one of the paths is a path from the stator core to the outer ring of the shaft bearing through the molding resin. This path is referred to as the stator side. This path on the stator side is not electrically continuous and is disposed having a certain interval in the middle of the path, for example, having molding resin, which is an insulating material, in the middle of the path. Therefore, this path has an insulating structure, and the impedance of this path on the stator side is supposed to be in a high-impedance state. Further, since the impedance of this path is high, the high frequency signals generated on the stator core are transmitted to the outer ring of the shaft bearing while being attenuated. It is considered that, as a result of that, a low-potential high-frequency voltage is generated on the outer ring of the shaft bearing.

In addition, as the other path, there is a path that continues from the stator core to the inner ring of the shaft bearing through an air gap between the stator core and the rotor core, the rotor core, and the rotary shaft. This path is referred to as the rotor side. As this path on the rotor side, the stator core and the rotor core face each other through a fine air gap between the stator core and the rotor core. Further, the structure from the outer peripheral surface, of the rotor core, facing the stator core, to the inner ring of the shaft bearing through the rotor core and the rotary shaft is typically made of metal, which is conductive. Therefore, the impedance of this path on the rotor side is supposed to be in a low-impedance state. Further, since the impedance of this path is low, the high frequency signals generated on the stator core and transmitted to the rotor core reach the inner ring of the shaft bearing without being attenuated. It is considered that, as a result of that, a high-potential high-frequency voltage is generated on the inner ring of the shaft bearing.

As described above, in the structure of a generally used brushless motor, the impedance on the stator side and the impedance on the rotor side are likely to be imbalanced. It is therefore considered that this imbalance causes a voltage difference, in other words, a shaft voltage to be generated between the inner ring of the shaft bearing and the outer ring of the shaft bearing, thereby generating electrolytic corrosion on the shaft bearing.

To address this issue, PTL 1 discloses a measure as a countermeasure to the electrolytic corrosion occurring on the shaft bearing. In the measure, the shaft voltage is reduced by lowering the impedance on the stator side so that the impedance on the stator side becomes close to the impedance on the rotor side.

However, in this measure, since the impedance on the stator side is lowered, the above-mentioned high frequency signals are less attenuated, and a high potential high-frequency voltage is generated also on the outer ring of the shaft bearing. Thus, the inner ring of the shaft bearing and the outer ring of the shaft bearing are always in balance in a state where the potentials are always high. Therefore, if the impedance balance is lost due to variation of accuracy in assembling the motor or other causes, the shaft voltage can become rather higher and can cause electrolytic corrosion.

To address the above issues, the inventors of the present application employed a configuration in which a dielectric layer was provided between the rotary shaft and the rotor to deal with the electrolytic corrosion occurring on the shaft bearing.

By employing such a configuration, capacitance due to the dielectric layer is series connected, as an equivalent circuit, to the conventional low-impedance rotor side, and the impedance on the rotor side becomes high. With this configuration, the impedance on the rotor side can be made close to the impedance on the stator side, and the shaft voltage can be reduced.

Since the impedance on the rotor side is increased by this measure, the potential generated on the inner ring of the shaft bearing becomes low, and the balance of potential is maintained between the inner ring of the shaft bearing and the outer ring of the shaft bearing in a state where the potentials are always low. Therefore, even if the impedance balance has been lost due to variation of accuracy in assembling the motor or other causes, the shaft voltage is not increased to such magnitude that causes electrolytic corrosion. In addition, since the impedance on the rotor side can be set by changing, for example, a thickness of the dielectric layer, it is possible to easily adjust a variation in the impedance balance.

On the other hand, as a measure (fire countermeasure) to prevent fire from leaking outside the motor when an excessive current flows through the coil wound on the stator core, the inventors of the present application focused on the coil ends protruding in the shaft direction from the stator core.

Specifically, the coil wound on the stator core is enclosed by the stator core, except the coil ends protruding from the stator core in the shaft direction. Therefore, ignited fire hardly leaks outside the motor. On the other hand, since the coil ends protrude from the stator core, the coil ends are in contact with the molding resin. Therefore, if a crack or the like is created near the molding resin in contact with the coil ends, the ignited fire can leak outside the motor through a part, of the molding resin, having the crack.

To address this issue, the inventors of the present application found that by providing a metal member, as a fire countermeasure, on the outer surface of the molding resin and on a part facing the coil end, the metal member can block fire from leaking out from a part, of the molding resin, having a crack.

By the way, if the metal member is provided on the outer surface of the molding resin, there is added capacitance created by a structure in which the molding resin is put between the stator core and the metal member. Therefore, there is a possibility that the impedance on the stator side may be varied, so that the balance between the impedance on the stator side and the impedance on the rotor side may be lost.

However, since the above added capacitance is parallelly added to a capacitance initially formed on the stator side, the impedance on the stator side varies to become smaller. Therefore, since the impedance on the rotor side is once adjusted to become close to the impedance on the stator side as an electrolytic corrosion countermeasure, it is possible to adjust the variation in the impedance balance with some margin only by changing, for example, the thickness of the dielectric layer provided on the rotor side.

The present invention has been made based on the above knowledge and provides a molded motor that can prevent electrolytic corrosion on a shaft bearing and can prevent, even when by any chance an excessive current flows through the coil wound on the stator core, fire from leaking outside the motor.

Hereinafter, exemplary embodiments of the present invention will be described in detail with reference to the drawings. Note that the present invention is not limited to the following exemplary embodiments. In addition, it is possible to appropriately modify the exemplary embodiments as long as the effect of the present invention can be obtained.

First Exemplary Embodiment

FIG. 1 is a half cross-sectional view schematically showing a configuration of a molded motor in a first exemplary embodiment of the present invention. Note that in the following description, the direction (X direction) along a rotary shaft of a motor is referred to as a "shaft direction", the radial direction (Y direction), centering on the rotary shaft is referred to as a "radial direction", and the direction circling around the rotary shaft as a center is referred to as a "circumferential direction".

As shown in FIG. 1, molded motor 100 in the present exemplary embodiment includes: rotor 20; and stator 10 disposed, on an outer side of rotor 20 in the radial direction, to face rotor 20. Note that in molded motor 100 in the present exemplary embodiment, there is embedded circuit board 18 on which a circuit to control driving of the motor is mounted.

Stator 10 has: stator core 11 which is constituted by a plurality of metallic sheets laminated along the shaft direction X and on which a plurality of salient poles are formed; and coils 12 wounded on stator core 11 via insulators 13 made of an insulating material with each coil 12 wound on each of the salient poles. Further, stator 10 is covered with molding resin 14 in an approximately circular cylindrical shape, and a pair of metal brackets 17A, 17B are attached to both end parts of molding resin 14, in the shaft direction. Further, the pair of metal brackets 17A, 17B each fix each of outer rings of a pair of shaft bearings 30A, 30B, at a center in the radial direction.

Rotor 20 has: rotary shaft 21; and rotary body 22 fixed to rotary shaft 21, and outer peripheral surface 23a of rotary body 22 is equipped with magnet 23. Further, rotary shaft 21 is fixed to inner rings of the pair of shaft bearings 30A, 30B, and rotor 20 is rotatably supported by these bearings.

Note that, in the present exemplary embodiment, a material of the molding resin is not particularly limited, but an epoxy resin, a polyester resin, or the like, which is excellent in thermal conductivity, can be used, for example.

In molded motor 100 in the present exemplary embodiment, as an electrolytic corrosion countermeasure for shaft bearings 30A, 30B, dielectric layer 25 formed of an insulating material is provided between rotary shaft 21 and outer peripheral surface 23a, of rotor 20, on an outer side in the radial direction, as shown in FIG. 1. With this configuration, capacitance due to dielectric layer 25 is series connected, as an equivalent circuit, to a side of low-impedance rotor 20, and the impedance on the side of rotor 20 becomes high. As a result, the impedance on the side of rotor 20 can be made close to the impedance on the side of stator 10, and the shaft voltages can be reduced. Thus, it is possible to prevent electrolytic corrosion from occurring on shaft bearings 30A, 30B.

Since the impedance on the side of rotor 20 is increased by this measure, and potentials are balanced between the inner rings of shaft bearings 30A, 30B and the outer rings of shaft bearings 30A, 30B in a state where the potentials are always low. Therefore, even if the impedance balance has been lost due to a variation of accuracy in assembling the motor or other causes, the shaft voltage is not increased to such magnitude that causes electrolytic corrosion. In addition, since the impedance on the side of rotor 20 can be set by changing the capacitance due to dielectric layer 25, it is possible to easily adjust a variation in the impedance balance. The capacitance due to dielectric layer 25 can be set by changing, for example, a thickness of dielectric layer 25 or a dielectric constant of the material.

Note that in the present exemplary embodiment, the material of dielectric layer 25 is not particularly limited, and the following materials can be used, for example: a polystyrene resin such as syndiotactic polystyrene (SPC); and a polyester resin such as polybutylene terephthalate (PBT) and polyethylene terephthalate (PET).

In molded motor 100 in the present exemplary embodiment, as an electrolytic corrosion countermeasure for shaft bearings 30A, 30B, a configuration is employed in which the pair of metal brackets 17A, 17B are electrically connected to each other with conductive member 19 buried in molding resin 14, as shown in FIG. 1.

With such a configuration employed, the pair of metal brackets 17A, 17B have the same potential, and the voltages on the outer ring sides of the pair of shaft bearings 30A, 30B can be made identical. Therefore, when as an electrolytic corrosion countermeasure, the dielectric constant, for example, of dielectric layer 25 provided on the side of rotor 20 is adjusted to make the impedance on the side of rotor 20 close to the impedance on the side of stator 10, it is possible to adjust the shaft voltages of the pair of shaft bearings 30A, 30B to be the same value. As a result, a high electrolytic corrosion control effect can be achieved in molded motor 100 in the present exemplary embodiment.

In addition, in the present exemplary embodiment, a fire countermeasure of molding resin 14 is also taken in molded motor 100. In this fire countermeasure, as shown in FIG. 1, metal members 16A, 16B are provided, in a circumferential direction, on an outer peripheral side of coil ends 12a in the radial direction Y and on at least part facing coil ends 12a. Specifically, metal members 16A, 16B each having a belt shape are provided apart from each other on outer surface 14a, which is an outer peripheral surface of molding resin 14 in the radial direction, in such a manner that metal members 16A, 16B are disposed in the circumferential direction, on the parts facing coil ends 12a. In this case, coil ends 12a are parts protruding toward both sides of stator core 11 in the shaft direction X.

Coils 12 wound on the stator core 11 are enclosed by stator core 11, except coil ends 12a protruding from stator core 11 in the shaft direction X. Therefore, ignited fire hardly leaks outside the motor. On the other hand, since coil ends 12a protrude from stator core 11, coil ends 12a are in contact with molding resin 14. Therefore, if a crack or the like is created in molding resin 14 in contact with coil end 12a, the ignited fire can leak outside the motor through a part, of molding resin 14, having the crack.

To address such a problem, in the present exemplary embodiment, metal members 16A, 16B each having a belt shape are provided on outer surface 14a of molding resin 14 and on the parts facing coil ends 12a. Therefore, the fire that is about to leak out through the part, of molding resin 14, having a crack can be blocked by metal members 16A, 16B. With this configuration, even if by any chance, an excessive current flows through coils 12 wound on stator core 11, fire can be prevented from leaking outside molded motor 100.

When metal members 16A, 16B are provided on outer surface 14a of molding resin 14, there is added capacitance created by the structure in which molding resin 14 is put between metal members 16A, 16B and stator core 11. Therefore, there is a possibility that the impedance on the stator side may be varied, so that the balance between the impedance on the stator side and the impedance on the rotor side may be lost.

However, the above added capacitance is parallelly added to capacitance initially formed on the side of stator 10. Therefore, the impedance on the side of stator 10 varies to become smaller. Further, the impedance on the rotor 20 side is originally adjusted to become close to the impedance on the side of stator 10 by using dielectric layer 25, as an electrolytic corrosion countermeasure. Therefore, even if the balance of impedance has been lost, it is possible to adjust the variation in the impedance with some margin only by changing, for example, a thickness of dielectric layer 25 provided on the side of rotor 20.

Note that, in the present exemplary embodiment, metal brackets 17A, 17B are disposed, via molding resin 14, on the outer sides of coil end 12a in the shaft direction. With this configuration, even if by any chance, a crack or the like has been created in the vicinity of a part, of molding resin 14, being in contact with coil end 12a in the shaft direction X, metal brackets 17A, 17B can block the fire that is about to leak out through the part, of molding resin 14, having the crack.

The present exemplary embodiment can prevent electrolytic corrosion on shaft bearings 30A, 30B in molded motor 100 in which stator 10 is covered with molding resin 14, and can prevents fire from leaking outside the motor even when an excessive current flows through coils 12 wound on stator core 11.

Second Exemplary Embodiment

Figure 2:
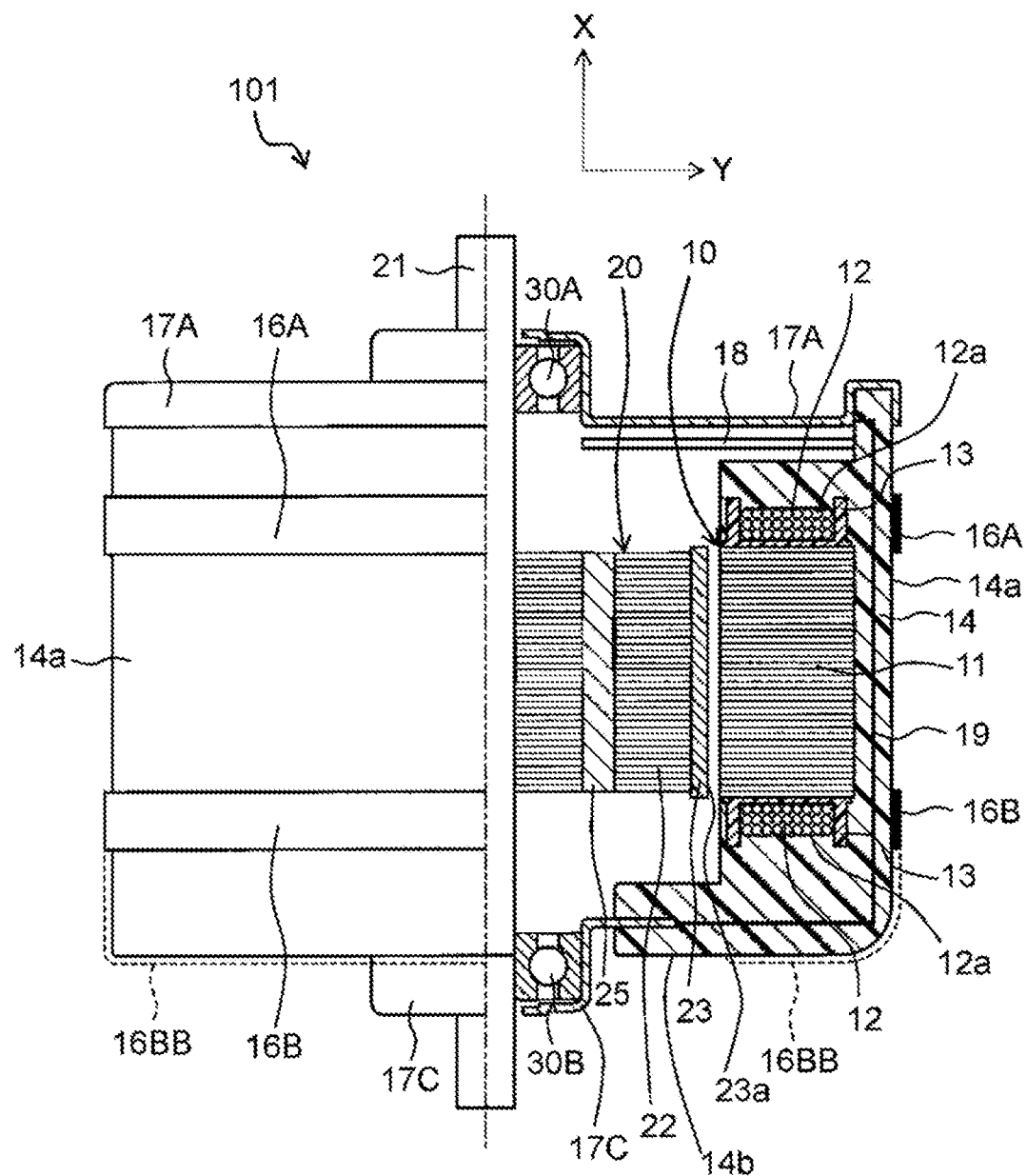
FIG. 2 is a half cross-sectional view schematically showing a configuration of a molded motor in a second exemplary embodiment of the present invention.

FIG. 2 is a half cross-sectional view schematically showing a configuration of molded motor 101 in a second exemplary embodiment of the present invention. Note that in molded motor 101 in the present exemplary embodiment, configurations of a pair of metal brackets 17A, 17C and molding resin 14 are different from the configurations in the first exemplary embodiment, but the other configurations are the same as in the first exemplary embodiment. In the following description, the components that are the same as the components having been once described are assigned the same reference marks, and the corresponding descriptions are used.

As shown in FIG. 2, in the present exemplary embodiment, lengths of outer peripheral diameters of the pair of metal brackets 17A, 17C are different from each other. Specifically, metal bracket 17A that fixes an outer ring of shaft bearing 30A has an outer peripheral diameter that is almost the same as an outer peripheral diameter of molding resin 14. An outer end part, of metal bracket 17A, in the radial direction is fit on an end part, of molding resin 14, in the shaft direction. On the other hand, an end part forming an outer periphery of metal bracket 17C fixing the outer ring of shaft bearing 30B is located in molding resin 14. The outer end part, of metal bracket 17C, in the radial direction is integrally molded together with molding resin 14. Therefore, on the side of shaft bearing 30B, regarding molding resin 14 being in contact with stator 10 in the shaft direction, an inner end part, of molding resin 14, in the radial direction extends to the vicinity of shaft bearing 30B.

In molded motor 101 in the present exemplary embodiment, as an electrolytic corrosion countermeasure for shaft bearings 30A, 30B, dielectric layer 25 is provided, in a similar manner as in the first exemplary embodiment, between rotary shaft 21 and outer peripheral surface 23a, of rotor 20, on an outer side in the radial direction. This configuration can make the impedance on the side of rotor 20 close to the impedance on the side of stator 10, thereby reducing the shaft voltages. As a result, it is possible to prevent electrolytic corrosion from occurring on shaft bearings 30A, 30B.

Further, as an additional electrolytic corrosion countermeasure, in a similar manner as in the first exemplary embodiment, the pair of metal brackets 17A, 17C may be electrically connected to each other with conductive member 19 buried in molding resin 14.

In molded motor 101 in the present exemplary embodiment, in a similar manner as in the first exemplary embodiment, the configuration is made as follows as a fire countermeasure for molding resin 14. Metal members 16A, 16B each having a belt shape are provided apart from each other on outer surface 14a, which is an outer peripheral surface of molding resin 14 in the radial direction, in such a manner that metal members 16A, 16B are disposed in the circumferential direction, on the parts facing coil ends 12a. With this configuration, the fire that is about to leak out through the part, of molding resin 14, having a crack can be blocked by metal members 16A, 16B. As a result, even if by any chance, an excessive current flows through coils 12 wound on stator core 11, fire can be prevented from leaking outside molded motor 101.

In the present exemplary embodiment, on the side of shaft bearing 30A, metal bracket 17A is disposed on the outer side of stator 10 in the shaft direction; however, on the side of shaft bearing 30B, shaft-direction end face 14b of molding resin 14 is exposed outside. However, regarding molding resin 14 covering stator 10, a thickness in the radial direction of stator 10 is generally formed thinner than a thickness, on the outer side, in the shaft direction so that an outer peripheral diameter of molded motor 101 can be small. Therefore, on the side of shaft bearing 30B, the possibility is low that the ignited fire leaks outside the motor from shaft-direction end face 14b of molding resin 14 being in contact with stator 10. Therefore, the effect of the fire countermeasure for molding resin 14 can be achieved only by providing metal member 16B on outer surface 14a, which is the outer peripheral surface, of molding resin 14, in the radial direction.

Note that if the thickness of a part, of molding resin 14, being in contact with stator 10 in the shaft direction is not thick enough for a fire countermeasure, metal member 16B provided on outer surface 14a of molding resin 14 may be extended to part 16BB facing coil end 12a on shaft-direction end face 14b of molding resin 14, as shown in FIG. 2.

The present exemplary embodiment can prevent electrolytic corrosion on shaft bearings 30A, 30B in molded motor 101 in which stator 10 is covered with molding resin 14, and can prevents fire from leaking outside the motor even when an excessive current flows through coils 12 wound on stator core 11.

Modified Example

Figure 3A:
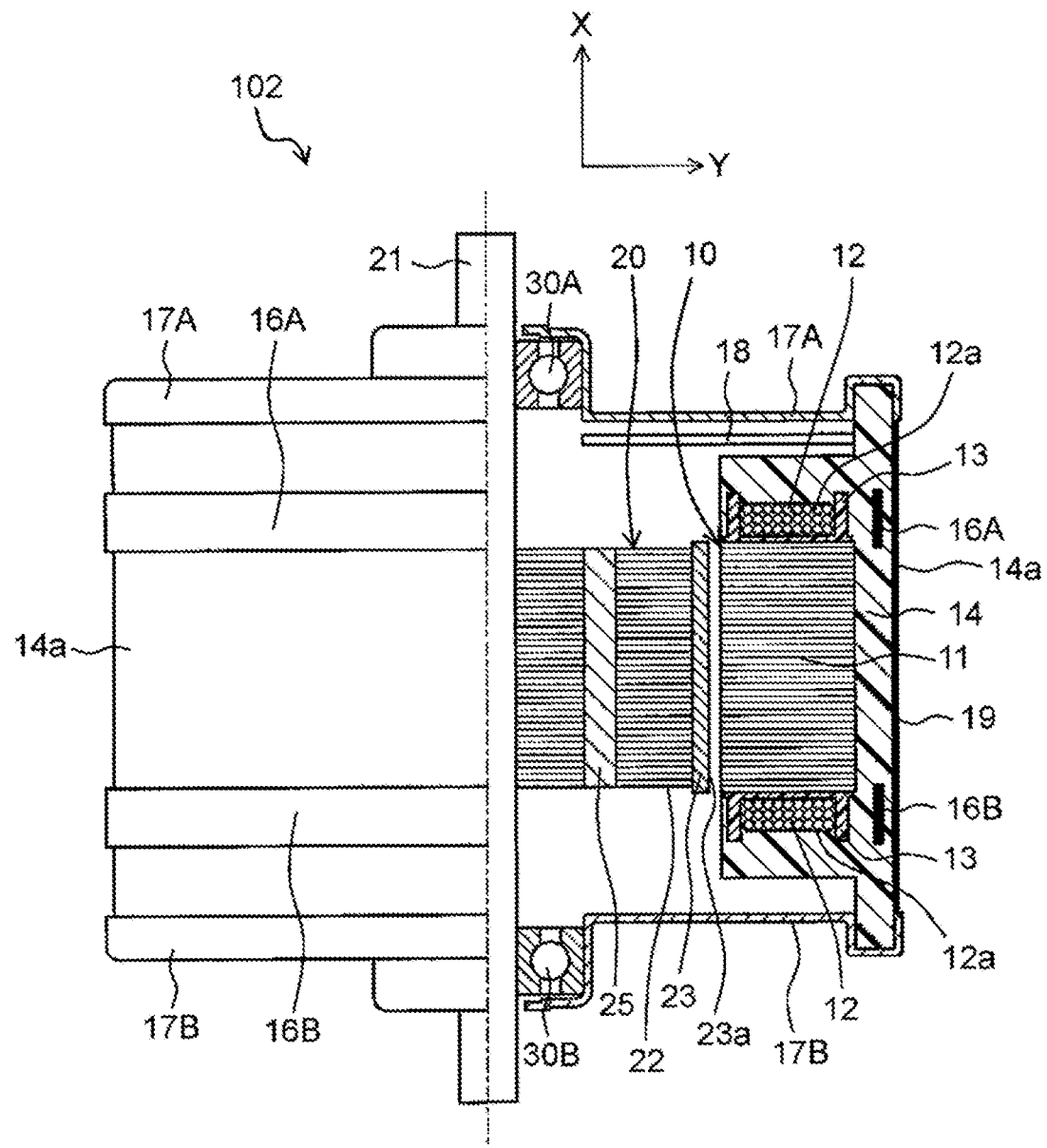
FIG. 3A is a half cross-sectional view schematically showing a configuration of a molded motor in a modified example of the present invention.
Figure 3B:
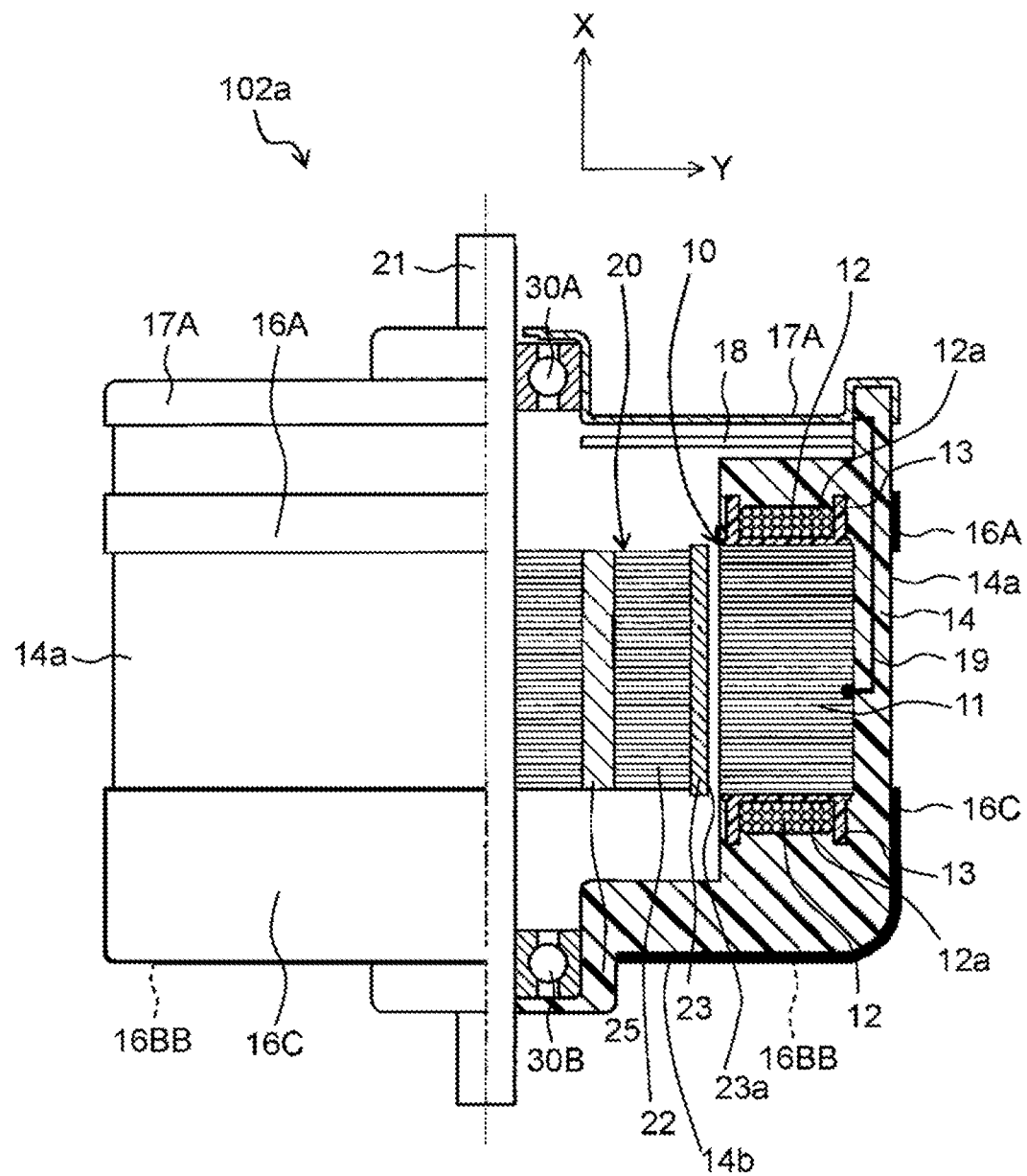
FIG. 3B is a half cross-sectional view schematically showing a configuration of a molded motor in another modified example of the present invention.

FIGS. 3A and 3B are half cross-sectional views each schematically showing a configuration of a molded motor in a modified example of the present invention. In the above exemplary embodiments, as shown in FIGS. 1, and 2, metal members 16A, 16B are disposed on outer surface 14a of molding resin 14; however, as molded motor 102, metal members 16A, 16B may be embedded in molding resin 14 as shown in FIG. 3A.

Further, in the above exemplary embodiments, as shown in FIGS. 1 and 2, conductive member 19 is disposed in molding resin 14; however, conductive member 19 may be disposed on outer surface 14a of molding resin 14, as shown in FIG. 3A.

In the above, the present invention is described based on the exemplary embodiments, but the above description does not limit the invention, and various modifications can, of course, be made. For example, in the above exemplary embodiments, metal members 16A, 16B each having a belt shape are provided apart from each other on outer surface 14a of molding resin 14 and on the parts facing coil ends 12a; however, a metal member may be provided on the entire area of outer surface 14a of molding resin 14. In this case, capacitance formed between the metal member and stator core 11 is added, but this capacitance causes the impedance on the side of stator 10 to vary to become smaller; therefore, the capacitance does not affect the electrolytic corrosion countermeasure employed in the present invention at all.

In the above exemplary embodiments, dielectric layer 25 provided in rotor 20 is provided between an inner peripheral side and an outer peripheral side of rotary body 22; however, the present invention is not limited to the above configuration, and dielectric layer 25 can be provided at any position between rotary shaft 21 and outer peripheral surface 23a, of rotor 20, on the outer side in the radial direction. For example, dielectric layer 25 may be provided between rotary shaft 21 and an inner peripheral surface, of rotary body 22, in the radial direction.

Further, in the above exemplary embodiments, shaft bearings 30A, 30B are fixed via metal brackets 17A, 17B, 17C attached on molding resin 14; however, inner end part, of molding resin 14, in the radial direction may be extended to shaft bearings 30A, 30B so that molding resin 14 can fix shaft bearings 30A, 30B. Also in this case, as a fire countermeasure for molding resin 14, metal members 16A, 16B only have to be provided on outer surface 14a, which is the outer peripheral surface of molding resin 14 in the radial direction, and on at least the parts facing coil ends 12a. Note that also in this case, since molding resin 14 being in contact with coil ends 12a are exposed outside also on the outer side of coil ends 12a in the shaft direction, metal members 16A, 16B may be extended to the parts facing coil ends 12a, on the top surface, of molding resin 14, in the shaft direction.

Specifically, as in motor 102a shown in FIG. 3B, one shaft bearing 30A of the pair of shaft bearings 30A, 30B is fixed to metal bracket 17A. Shaft bearing 30B on an opposite side is fixed to molding resin 14.

In the present configuration, conductive member 19, which is an electrolytic corrosion countermeasure, electrically connects metal bracket 17A and stator core 11 to each other.

Further, molding resin 14 is formed to cover shaft bearing 30B on the opposite side. Therefore, metal member 16C, which is a fire countermeasure, is formed to face coil end 12a and shaft bearing 30B located on the lower part of the drawing.

If the present configuration is employed, it is possible to provide actions and effects similar to the actions and effects of the above-mentioned exemplary embodiments.

Third Exemplary Embodiment

Figure 4:
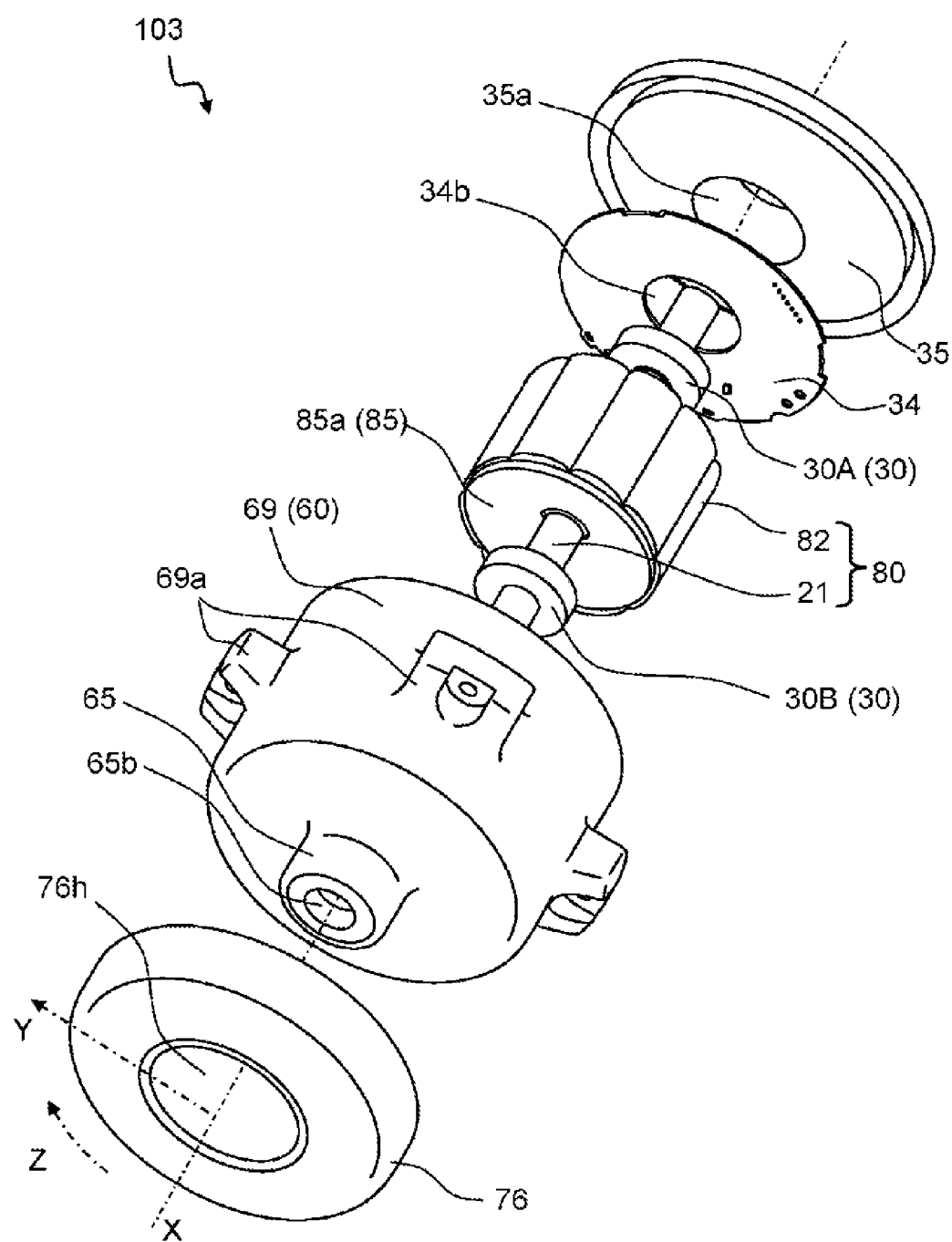
FIG. 4 is an exploded perspective view of a molded motor in a third exemplary embodiment of the present invention.
Figure 5:
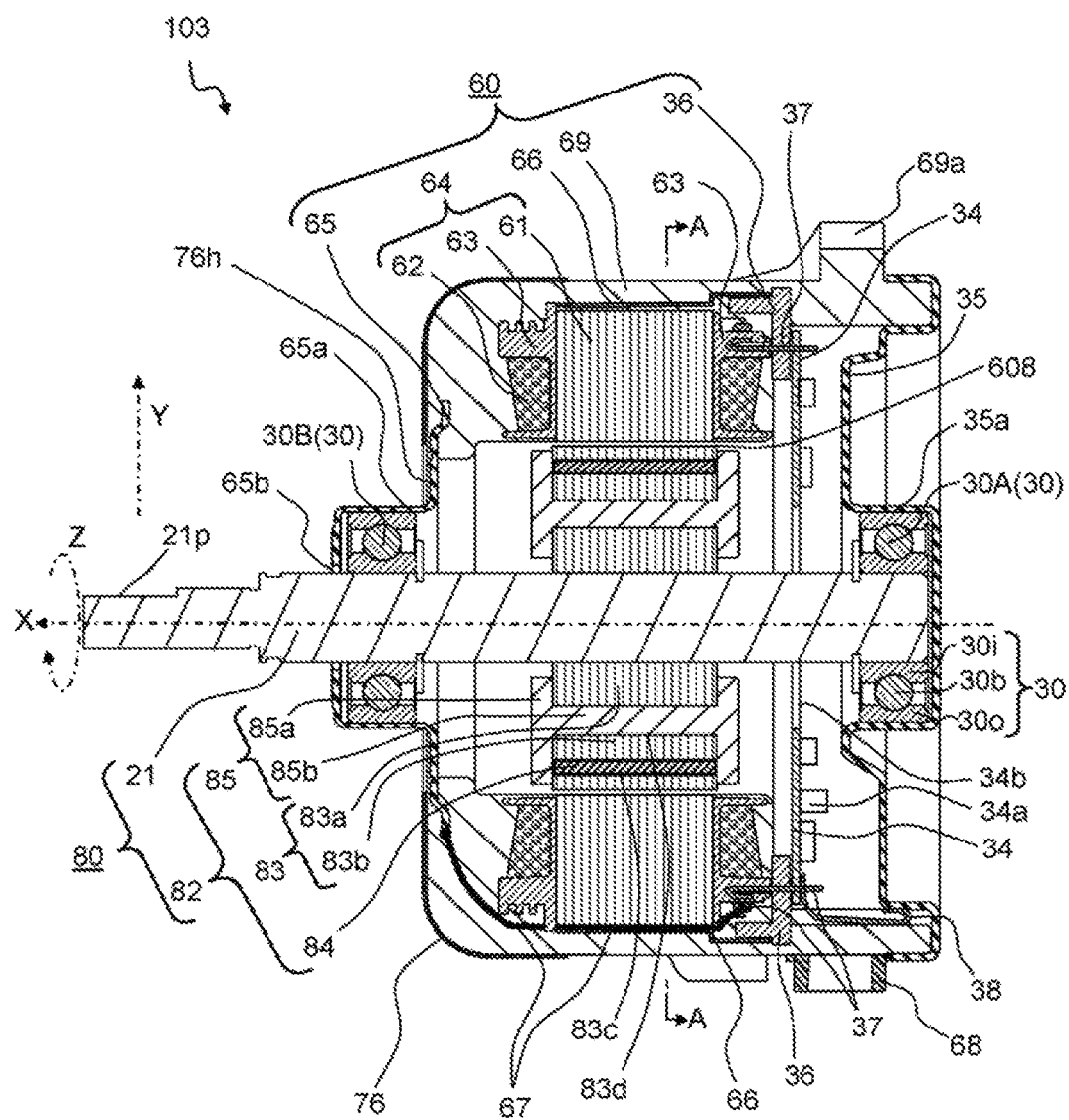
FIG. 5 is a cross-sectional view of the molded motor in the third exemplary embodiment.
Figure 6:
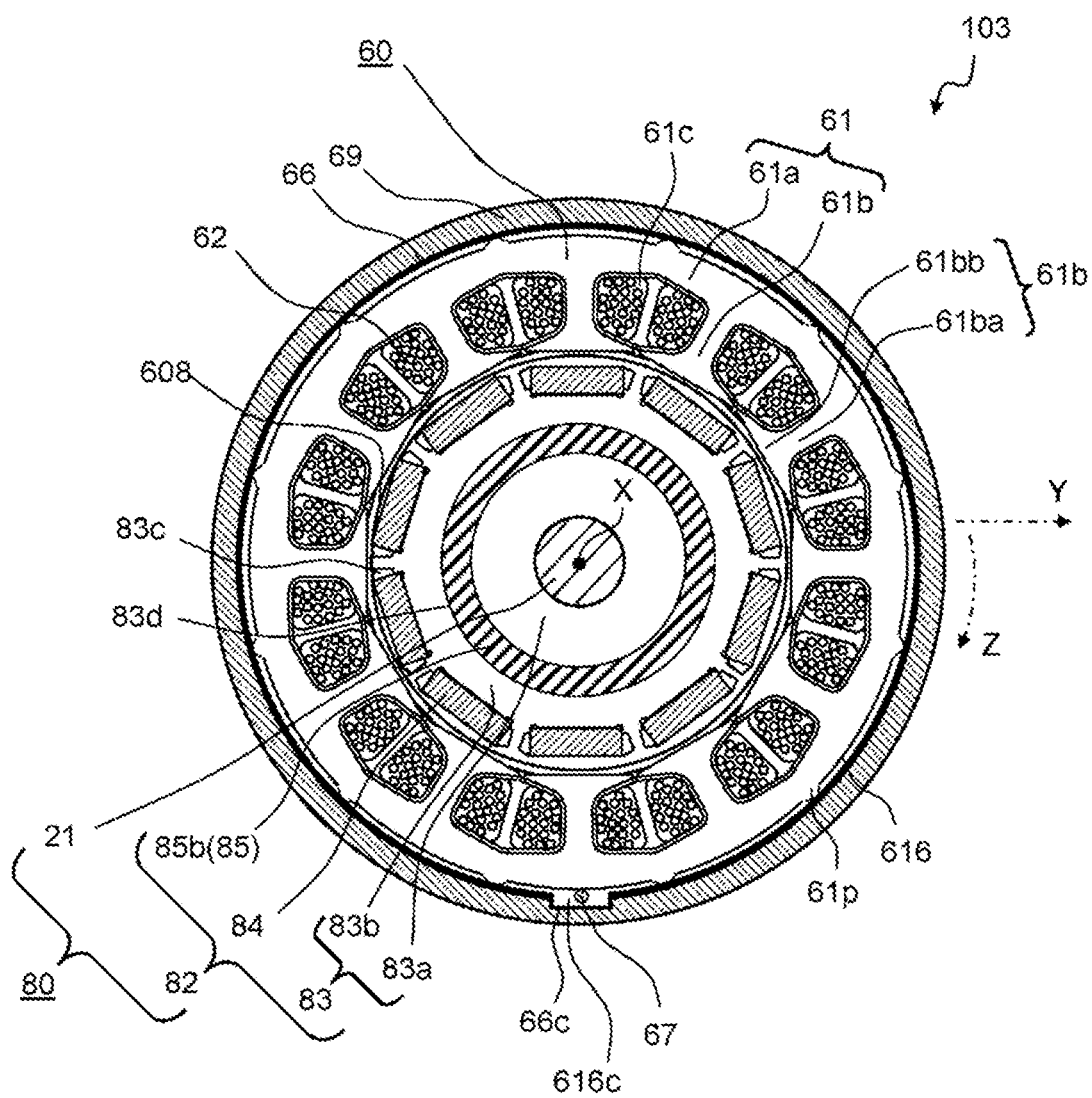
FIG. 6 is a plan cross-sectional view of the molded motor in the third exemplary embodiment taken along line A-A in FIG. 5.
Figure 7:
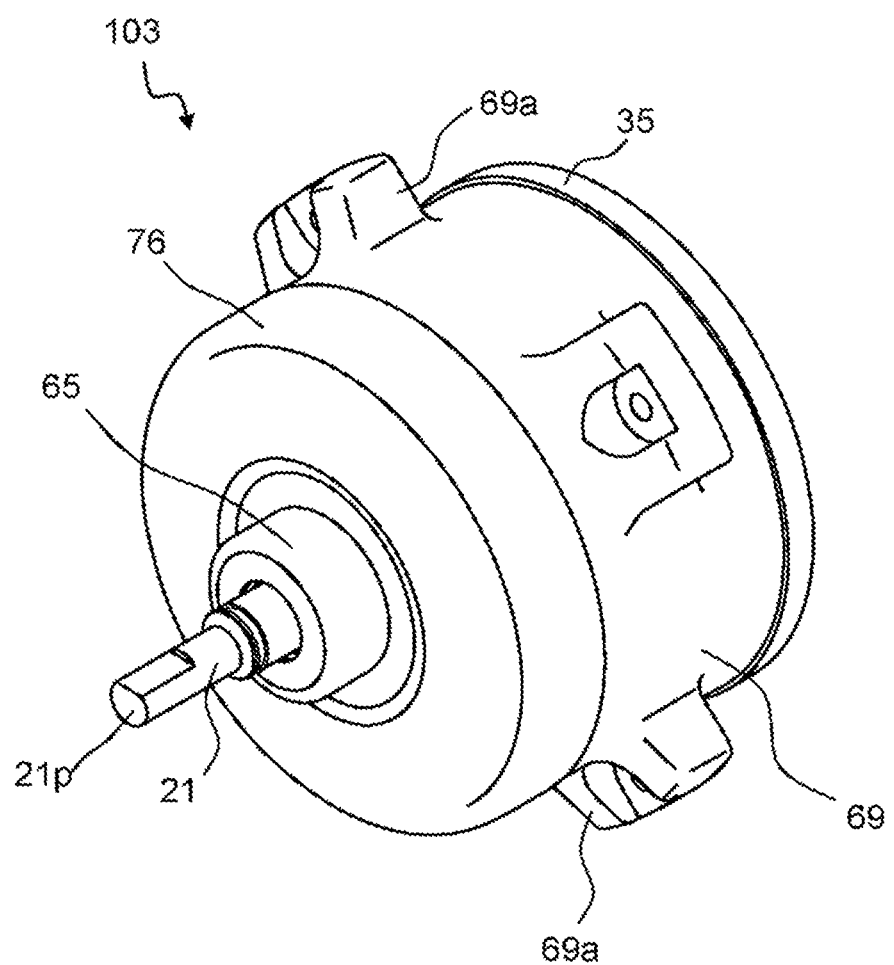
FIG. 7 is an external perspective view of the molded motor in the third exemplary embodiment.
Figure 8:
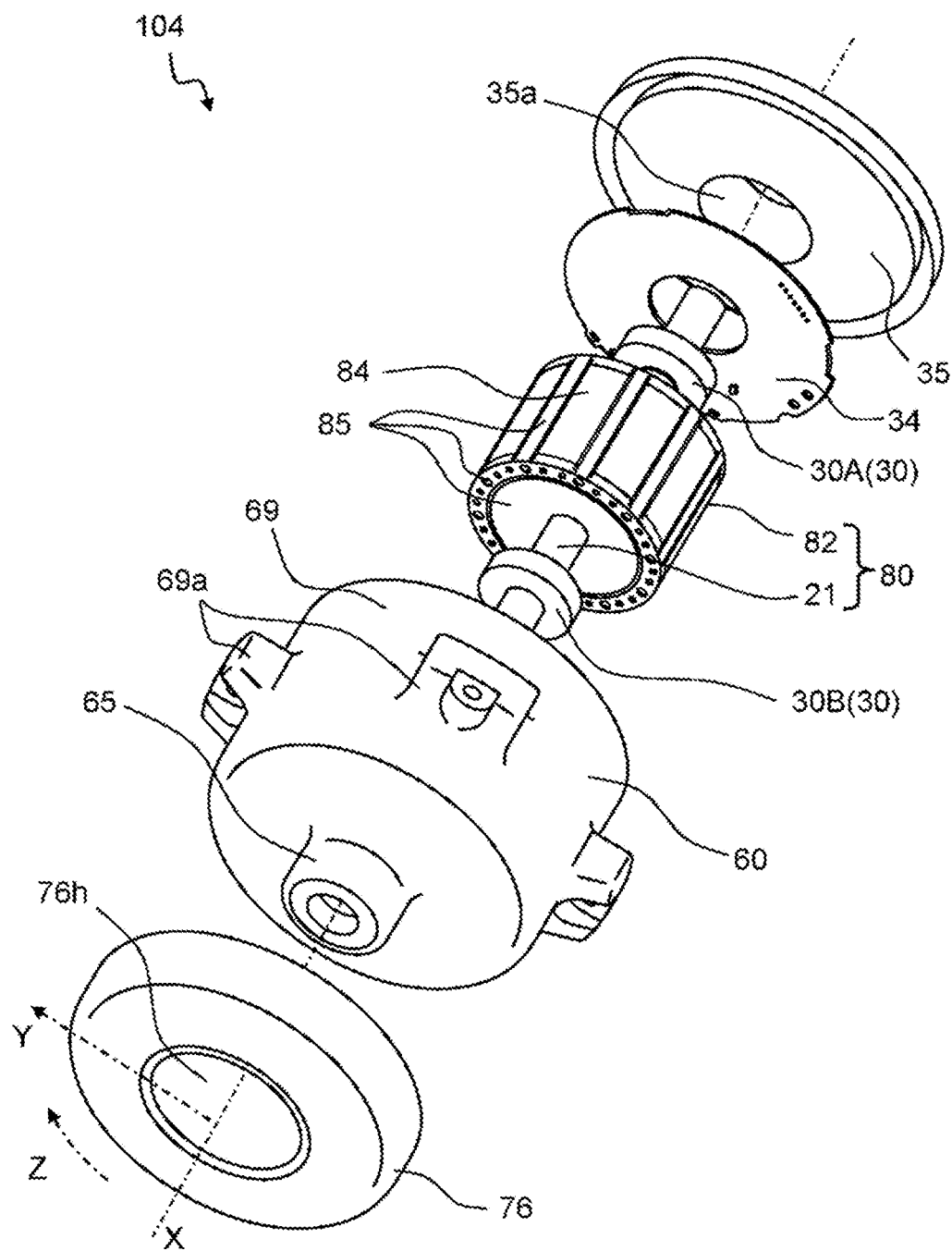
FIG. 8 is an exploded perspective view of another molded motor in the third exemplary embodiment.

FIG. 4 is an exploded perspective view of molded motor (hereinafter, appropriately referred to as a motor) 103 in a third exemplary embodiment of the present invention. FIG. 5 is a cross-sectional view of motor 103 according to the third exemplary embodiment of the present invention. FIG. 6 is a plan cross-sectional view of motor 103 according to the third exemplary embodiment of the present invention taken along line A-A in FIG. 5. FIG. 7 is an external perspective view of motor 103 according to the third exemplary embodiment of the present invention. Further, FIG. 8 is an exploded perspective view of another molded motor in the third exemplary embodiment of the present invention.

Also in the present exemplary embodiment, a description will be given on motor 103 as an example of a brushless motor which includes permanent magnets on a rotor and in which a stator is covered with molding resin. Hereinafter, as show in FIG. 4, a direction represented by "X" in which rotary shaft 21 extends is a shaft direction. A description will be given supposing that, in a plane perpendicular to the shaft direction X as shown in FIG. 6, a direction indicated by "Y" spreading from center X of rotary shaft 21 is a radial direction, and a direction indicated by "Z" circling around central point X is a circumferential direction.

Further, also in the present exemplary embodiment, a metal member is provided on the molding resin as a fire countermeasure to prevent that fire and smoke come outside a main body of motor 103 due to, for example, a problem that an excessive current flows through a coil. Specifically, in the present exemplary embodiment, as this metal member, a metallic cover made of metal is used. More specifically, as shown in FIG. 5, the metallic cover is configured with metallic inner cover 66 and metallic outer cover 76.

Further, also in the present exemplary embodiment, in a similar manner as in the first and second exemplary embodiments, as an electrolytic corrosion countermeasure for shaft bearings 30A, 30B, inner resin part 85b as a dielectric layer is provided, on rotor 80, between rotary shaft 21 and an outer peripheral surface, of rotary body 82, on the outer side in the radial direction. Further, for a higher electrolytic corrosion control effect, in a similar manner as in the first exemplary embodiment, in motor 103, first bracket 35 attached to shaft bearing 30A and second bracket 65 attached to shaft bearing 30B are electrically connected to each other with a conductive member including lead wire 67.

First, an overall configuration of motor 103 will be described. As shown in FIG. 4, motor 103 in the present exemplary embodiment includes: stator 60 covered with molding resin part 69, which is molding resin; rotor 80; shaft bearings 30A, 30B, which are a pair of shaft bearings 30; and metallic outer cover 76, which is a metal member. Motor 103 further includes first bracket 35 and circuit board 34. Note that for easy understanding of a configuration of motor 103, metallic inner cover 66 to be described later is not shown FIG. 4.

As shown in FIG. 5, stator 60 includes coil assembly 64 including stator core 61, coils 62, and insulators 63. Coil assembly 64 is assembled with coils 62 wound on the salient poles of stator core 61 via insulators 63 made of an insulating material in a similar manner as in the above exemplary embodiments.

Further, as shown in FIG. 6, stator core 61 has a ring-shaped yoke 61a and a plurality of teeth 61b as salient poles extending inward in the radial direction from an inner peripheral surface of yoke 61a. These plurality of teeth 61b are disposed at the same intervals in circumferential direction Z, forming slots 61c, which are opening parts, each between teeth 61b. In the present exemplary embodiment, an example is described in which the plurality of teeth 61b are used to form 12 slots. In the following description, the words "teeth" (plural form of tooth) and "tooth" are separately used. Specifically, a plurality of salient poles extending in a central direction of stator core 61 are written as "teeth", and one salient pole of those salient poles is written as "tooth".

On an extending end part of each tooth 61b, tooth top end 61bb extending in circumferential direction Z is formed to be wider than a tooth middle part 61ba. An inner peripheral surface of each tooth top end 61bb serves as a magnetic pole surface that faces an outer peripheral surface of rotor 80. With respect to stator core 61 having the above configuration, coils 62 are formed by winding a winding wire on each tooth 61b while inserting the winding wire into an opening space of each slot 61c. Further, transition wires for connecting between coils 62 connect between individual coils 62. In addition, as shown in FIG. 5, wire ends of predetermined coils 62 are connected to pins 37 attached to insulators 63. In this case, pins 37 are electric connection member made of metal to be used as electric connection terminals. Tips of pins 37 protrude from terminal cap 36, as terminals for driving. Such coils 62 each on each tooth 61b as described above are energized and driven by, for example, three-phase alternating currents having a U-phase, a V-phase, and a W-phase that are different in electrical phase from each other by 120 degrees.

Further, in the present exemplary embodiment, stator 60 includes metallic inner cover 66 that is made of metal and is disposed to surround an outer periphery of stator core 61, as shown in FIG. 6, and includes second bracket 65 disposed to protrude from stator 60, as shown in FIG. 4. Further, as shown in FIG. 5, stator 60 is integrally molded with molding resin such that a resin material covers the following members disposed at predetermined positions, with some parts not covered with the molding resin. The members to be covered are coil assembly 64, metallic inner cover 66, second bracket 65, and terminal caps 36. As described above, stator 60 is configured to include molding resin part 69 in which the above-mentioned members are integrally molded with the molding resin. Stator 60 configured as described above has an approximately circular cylindrical shape, and on a columnar surface of stator 60 there are formed: mounting parts 69a for attaching motor 103 to an external device; a wire hole to which wire holder 68 is attached; and the like. Further, as the above uncovered parts, an inner peripheral surface of each tooth 61b, a protrusion of second bracket 65, and a terminal face of terminal cap 36 are exposed from molding resin part 69. Further, of both circular surfaces of stator 60, one surface is open, and first bracket 35 is attached to the opening to cover the opening like putting a lid. The other surface is closed, and second bracket 65 is disposed to protrude from the surface. Note that the configuration of stator 60 will be further described below in detail.

As shown in FIGS. 4 to 6, on the inner side of stator 60 as described above there is inserted rotor 80 with a predetermined distance between rotor 80 and stator 60 in radial direction Y. Specifically, motor 103 is an inner rotor type motor in which rotor 80 is disposed on the inner side of stator 60, and an inner peripheral surface of stator 60 and an outer peripheral surface of rotor 80 face each other in radial direction Y via a small air gap 60S. Also in the present exemplary embodiment, such inner rotor type motor 103 will be described as an example.

Rotor 80 includes rotary body 82 that holds magnets 84, centering on rotary shaft 21 rotatably held by a pair of shaft bearings 30. In this case, each shaft bearing 30 is a ball bearing having a plurality of small-diameter balls 30b, as shown in FIG. 5. Specifically, in each shaft bearing 30, those small balls 30b are put between outer ring 30o having an annular shape and inner ring 30i having an annular shape smaller than outer ring 30o. Further, in the present exemplary embodiment, outer ring 30o of one shaft bearing 30A of the both shaft bearings 30 and outer ring 30o of another shaft bearing 30B are respectively fixed by first bracket 35 and second bracket 65. Rotary shaft 21 is fixed to those inner rings 30i.

Further, as shown in FIG. 5, rotary body 82 includes rotor core 83, magnets 84, and rotor resin part 85. Rotor core 83 is configured with, for example, a plurality of thin steel sheets laminated in shaft direction X and is fixed to rotary shaft 21 at approximately a central part of rotary shaft 21. Magnets 84 are permanent magnets and are arranged in rotor core 83, in the present exemplary embodiment.

As shown in FIGS. 5 and 6, in rotor core 83 there are formed a plurality of magnet insertion holes 83c arranged at the same intervals in circumferential direction Z and penetrating through rotor core 83 in shaft direction X. One magnet 84 is inserted in each magnet insertion hole 83c. The present exemplary embodiment describes an interior permanent magnet (IPM) type motor 103, in which magnets 84 are contained in rotor core 83 as described above. In the present exemplary embodiment, an example is described in which 10 magnets 84 are disposed (that is, a number of poles is 10) in such a manner that S pole and N pole of magnets 84 can be alternately arranged in circumferential direction Z. An example of motor 103 in the present exemplary embodiment is a brushless motor having 10 poles and 12 slots.

Further, in the present exemplary embodiment, as shown in FIG. 5, on rotary body 82 there is formed rotor resin part 85 made of resin to integrate rotor core 83 and magnets 84 into one body. In the present exemplary embodiment, this rotor resin part 85 holds magnets 84, and rotor resin part 85 also functions as the above-mentioned dielectric layer to reduce electrolytic corrosion. For this purpose, resin through hole 83d is formed in rotor core 83 to penetrate through rotor core 83 in shaft direction X. As a specific material for rotor resin part 85, it is possible to use a material similar to the material of dielectric layer 25 in the first exemplary embodiment.

This rotor resin part 85 is provided with disk-shaped end plate resin parts 85a formed on both end parts, of rotor resin part 85, in shaft direction X such that disk-shaped end plate resin parts 85a are disposed to sandwich magnets 84 in shaft direction X. Further, in the present exemplary embodiment, resin through hole 83d of rotor core 83 is also filled with the resin material, which connects end plate resin parts 85a on the both end parts to each other with resin in shaft direction X. The resin material filling resin through hole 83d constitutes inner resin part 85b as part of rotor resin part 85. In the present exemplary embodiment, the above-described rotor resin part 85 closes openings on the both ends of magnet insertion holes 83c and securely fixes each magnet 84 to rotor core 83. In addition, with this configuration, even if motor 103 is used for water-section devices, outdoor units of air conditioners, and the like, which are in contact with rain water and dew condensation water, magnets 84 are prevented from being in contact with water. Although the present exemplary embodiment describes such inner rotor type motor 103, the motor may be a surface permanent magnet type (SPM type) motor 104 as shown in FIG. 8, in which magnets 84 are held on the outer peripheral surface of rotor 80.

Further, resin through hole 83d in the present exemplary embodiment penetrates through rotor core 83 in shaft direction X and has an annular shape circling around rotary shaft 21 as a center in radial direction Y, as shown in FIG. 6. In other words, resin through hole 83d is disposed to extend, as a circular cylindrical-shaped space, in rotor core 83 from one end face to the other end face of rotor core 83. The resin of rotor resin part 85 fills such resin through hole 83d to form inner resin part 85b. Since inner resin part 85b is made in a circular cylindrical shape as described above, rotor core 83 is separated into inner rotor core 83a constituting an inner side and outer rotor core 83b constituting an outer side, as can be seen in FIGS. 5 and 6. Inner resin part 85b is made of a resin material, which is an electrically insulating material. Therefore, inner rotor core 83a and outer rotor core 83b of rotor core 83 are electrically insulated and separated from each other by inner resin part 85b. In the present exemplary embodiment, by insulating and separating rotor core 83 as described above, inner resin part 85b of rotor resin part 85 is made to function as the above-mentioned dielectric layer to increase the impedance on the side of rotor 80 to become close to the impedance on the side of stator 60, so that occurrence of electrolytic corrosion on shaft bearing 30 is reduced.

As described above, rotor 80 is configured with rotary body 82 having a columnar shape as shown in FIG. 4 and rotary shaft 21 penetrating through a center of rotary body 82.

Further, as mentioned above, rotary shaft 21 is supported by shaft bearings 30A, 30B. Further, in the present exemplary embodiment, shaft bearings 30A, 30B are respectively fixed via first bracket 35 and second bracket 65 both made of metal and each disposed on each of both sides of stator 60 in the shaft direction.

As shown in FIGS. 4 and 5, first bracket 35 has an approximately disk shape and is configured to be attachable to an opening side of stator 60. Further, first bracket 35 has holder 35a formed to be recessed in a circular cylindrical shape at a central part, and holder 35a holds shaft bearing 30A. Thus, first bracket 35 in which shaft bearing 30A is inserted in holder 35a is attached to stator 60, so that one side of rotary shaft 21 is rotatably supported.

Further, second bracket 65 has a diameter smaller than a diameter of first bracket 35 and has a shape in which a disk and a cylinder are combined. Further, by the above-mentioned molding, second bracket 65 is fixed to molding resin part 69 of stator 60. Also at a central part of second bracket 65, there is a holder 65a formed to be recessed in a circular cylindrical shape, and shaft bearing 30B is held by holder 65a. Thus, by inserting shaft bearing 30B into holder 65a, the other side of rotary shaft 21 is rotatably supported with respect to stator 60. In the present exemplary embodiment, at a center of holder 65a, there is formed opening 65b, and rotary shaft 21 penetrates through this opening 65b and protrudes outward. Then, a protruding part of this rotary shaft 21 serves as output shaft 21p for a load or the like to be connected.

Further, also in the present exemplary embodiment, as mentioned above, first bracket 35 and second bracket 65 are electrically connected to each other with a conductive member, as one electrolytic corrosion countermeasures.

That is, motor 103 of the present exemplary embodiment includes first bracket 35 and second bracket 65, which are a pair of metal brackets to support the pair of shaft bearings 30. First bracket 35 and second bracket 65, which are the pair of metal brackets, are electrically connected to each other with the conductive member including lead wire 67 which is an electric wire passing through between stator core 61 and metallic inner cover 66.

Note that instead of the above configuration, a configuration may be used in which motor 102a shown in FIG. 3B is provided with metallic inner cover 66. In this case, the motor has metal bracket 17A, 35 to fix one shaft bearing 30A of the pair of shaft bearings 30.

Metal brackets 17A, 35 and stator cores 11, 61 are respectively electrically connected to each other with conductive members 19, 67 including the electric wires, which pass through between stator cores 11, 61 and metallic inner cover 66.

More specifically, as the conductive member, as shown in FIG. 5, lead wire 67 buried in molding resin part 69, pins 37 attached to insulators 63, and pin 38 for connecting to the bracket are used. In the present exemplary embodiment, lead wire 67 is put between an outer peripheral surface of stator core 61 and an inner peripheral surface of metallic inner cover 66. Note that a detailed configuration for electrically connecting between brackets 35, 65 will be further described below.

Further, in the present exemplary embodiment, metallic outer cover 76 made of metal is attached near second bracket 65 of stator 60. Metallic outer cover 76 has a hollow cup shape having opening part 76h at a center. This metallic outer cover 76 is attached to stator 60 such that second bracket 65 contained in stator 60 penetrates through opening part 76h of metallic outer cover 76. Note that detailed configurations of this metallic outer cover 76 and metallic inner cover 66 will be also described below.

Further, the present exemplary embodiment describes a configuration example in which motor 103 has circuit board 34 built-in on the opening side of stator 60. Circuit board 34 of the present exemplary embodiment has an approximately disk shape and has opening 34b formed at a central part for rotary shaft 21 to go through. On circuit board 34, there are mounted electronic components 34a such as a drive circuit, and to circuit board 34 there are connected connecting wires and the like through which a power supply voltage and a control signal are applied. In addition, the connecting wires for connection to the outside are drawn outside via wire holder 68 attached to the wire hole.

Further, to draw out wire ends of coils 62 from an inside of molding resin part 69 of stator 60, terminal cap 36 integrated together with molding resin part 69 is disposed in an inner space on an opening side of stator 60, as shown in FIG. 5. Terminal cap 36 is a member that is made of insulating resin and includes arrangement plates for a plurality of electric connection terminals to be arranged on.

Then, to these electric connection terminals, wire ends of coils 62 and the like are connected. In the present exemplary embodiment, as the electric connection terminals, there are used metal-made pins 37 exposed from terminal cap 36 and protruding in shaft direction X as shown in FIG. 5. Specifically, each of pins 37 is attached to predetermined insulator 63. Further, corresponding to positions of pins 37, holes are provided in terminal cap 36 to make pins 37 penetrate through terminal cap 36. Thus, when terminal cap 36 is simply attached to metallic inner cover 66, pins 37 protrude from terminal cap 36. In the present exemplary embodiment, in the inner space of stator 60, the exposed parts of these pins 37 are used for electric connection with circuit board 34, and this terminal cap 36 holds circuit board 34.

Motor 103 described above is configured through the following procedure. Specifically, first, stator 60 is configured by integrally molding, with resin, coil assembly 64, metallic inner cover 66, second bracket 65, and terminal cap 36 disposed at predetermined positions in a molding die. Shaft bearings 30A, 30B are attached to both sides of rotary shaft 21 of rotor 80. Then, rotor 80 to which these shaft bearings 30A, 30B are attached is inserted into stator 60 such that output shaft 21p protrudes from opening 65b of second bracket 65. Next, shaft bearing 30B is pressed into holder 65a of second bracket 65. Next, circuit board 34 is attached to terminal cap 36 on the opening side of stator 60. The connecting wires connected to circuit board 34 are drawn outside via wire holder 68. Then, shaft bearing 30A is pressed into holder 35a of first bracket 35, and first bracket 35 is attached on the opening side of stator 60 like a lid being put on. In this step, first bracket 35 comes into contact with pin 38 having resilience, and first bracket 35 and second bracket 65 are thus electrically connected. Finally, metallic outer cover 76 is attached near second bracket 65 of stator 60. As described above, motor 103 shown in FIG. 7 is completed.

When motor 103 configured as described above is supplied with a power supply voltage, control signals, and the like through the connecting wires, coils 62 are energized and driven by the drive circuit mounted on circuit board 34. When coils 62 are energized, drive currents flow through coils 62, and stator core 61 generates a magnetic field. Then, due to an alternating magnetic field from stator core 61 and magnetic fields from magnets 84 of rotor 80, attractive force and repulsive force are generated depending on polarities of those magnetic fields, and these pieces of force rotate rotor 80 in circumferential direction Z centering on rotary shaft 21.

Next, regarding motor 103 configured as described above, a detailed configuration of stator 60 including metallic inner cover 66 will be described.

Figure 9:
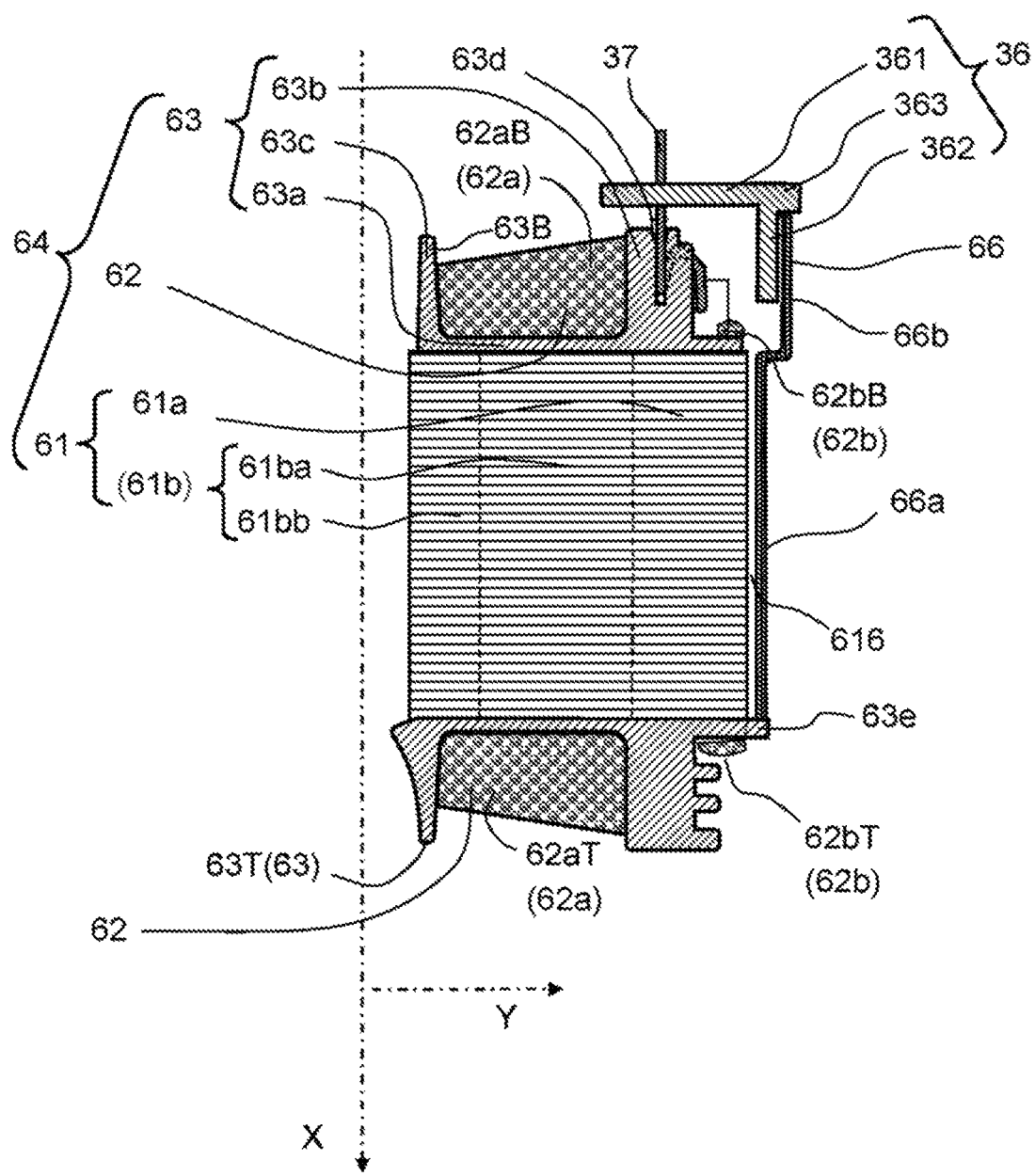
FIG. 9 is a cross-sectional view showing a positional relationship among a coil assembly, a metallic inner cover, and a terminal cap of the molded motor in the third exemplary embodiment.
Figure 10:
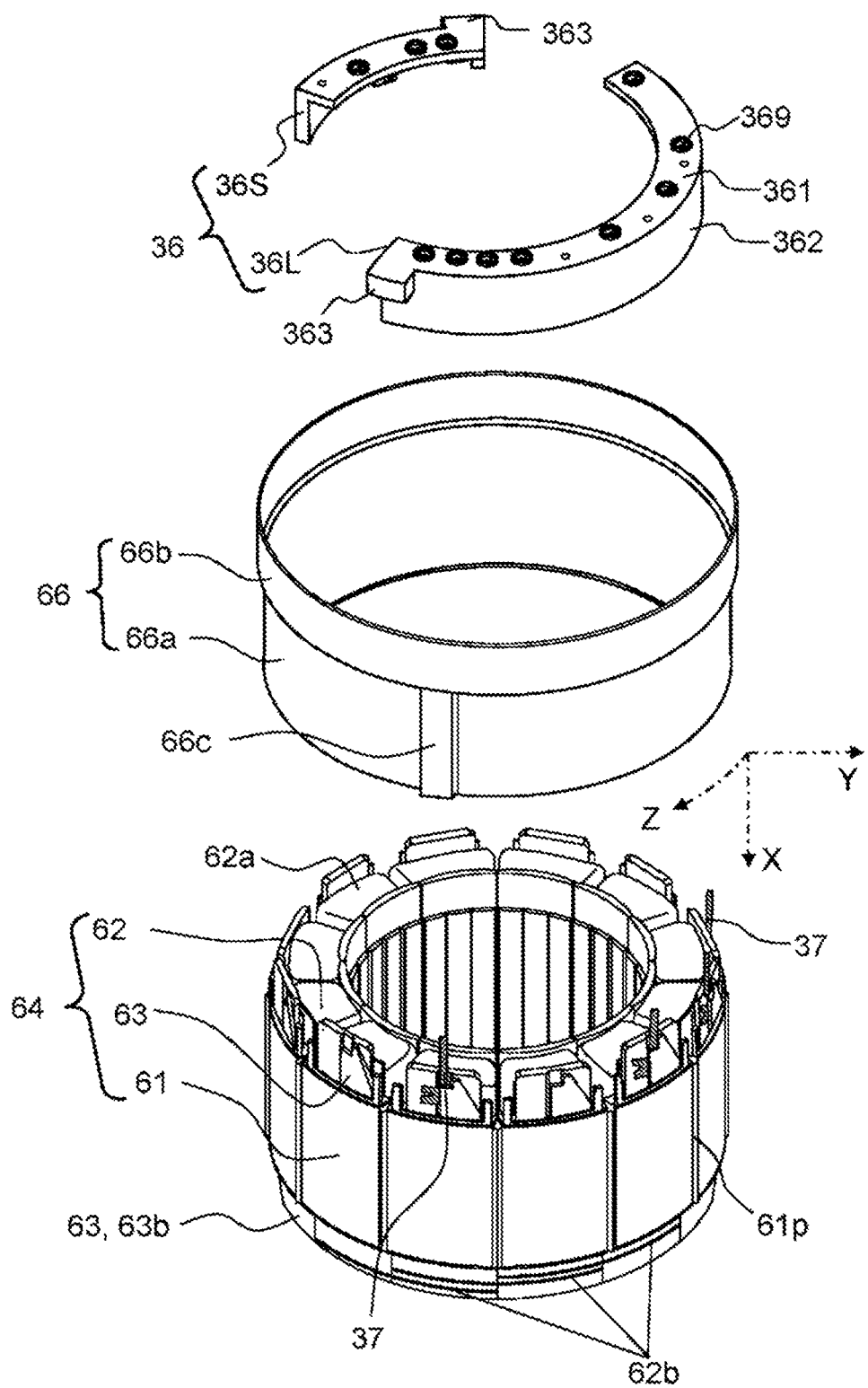
FIG. 10 is an exploded perspective view of the coil assembly, the metallic inner cover, and the terminal cap of the molded motor in the third exemplary embodiment.
Figure 11:
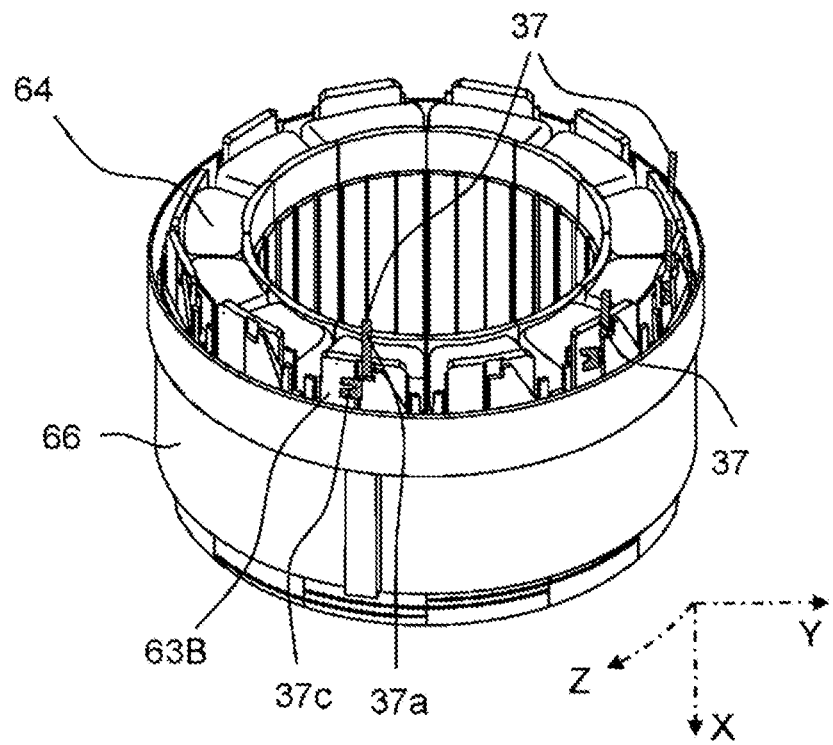
FIG. 11 is a diagram of a configuration in which the metallic inner cover is disposed on an outer periphery of the coil assembly of the molded motor in the third exemplary embodiment.

FIG. 9 is a cross-sectional view showing a positional relationship among coil assembly 64, metallic inner cover 66, and terminal cap 36. FIG. 10 is an exploded perspective view of coil assembly 64, metallic inner cover 66, and terminal cap 36. FIG. 11 is a diagram of a configuration in which metallic inner cover 66 is disposed on an outer periphery of coil assembly 64.

As shown in FIG. 9, insulator 63 roughly has: bottom surface part 63a attached to stator core 61; outer peripheral wall 63b constituting a wall on the outer peripheral side; inner peripheral wall 63c constituting a wall on the inner peripheral side.

Further, in the present exemplary embodiment, to each of a pair of end faces of each tooth 61b is attached one insulator 63. That is, coil assembly 64 includes a plurality of insulators 63.

In other words, insulators 63 are disposed on the both sides, in shaft direction X, of each salient pole formed on stator core 61. Insulator 63T on one side of insulators 63 disposed on the both sides in shaft direction X protrudes further in the outer peripheral direction than outer peripheral wall 63b, and has positioning parts 63e in contact with an end part of small-diameter part 66a of metallic inner cover 66.

Insulator 63B on the other side of insulators 63 disposed on the both sides in shaft direction X further has pin mounting part 63d to which pin 37 to be used as an electric connection terminal is attached.

A further detailed description will be given below with reference to the drawings. Bottom surface part 63a of each insulator 63 is formed of a plane perpendicular to shaft direction X. Then, the plane formed on bottom surface part 63a is closely attached to an end face, of stator core 61, in shaft direction X. Further, outer peripheral wall 63b and inner peripheral wall 63c are each formed of a wall surface parallel to shaft direction X. Above-described outer peripheral wall 63b is a wall that is vertically provided on the outer peripheral side of a part where coil 62 is formed and that restricts a coil position. Further, in outer peripheral wall 63b there is formed pin attachment groove 63d as pin mounting part such that pin 37 can be attached. Further, as shown in FIG. 9, inner peripheral wall 63c is located on the inner side, of outer peripheral wall 63b, in the radial direction, and serves as a wall vertically provided on the inner peripheral side of the part where coil 62 is formed, and inner peripheral wall 63c restricts the coil position.

Bottom surface part 63a of above-described insulator 63 is attached to each of surfaces located on both ends, of tooth 61b, in shaft direction X. A winding wire is wound via the pair of attached insulators 63. By performing the above work, one coil 62 is formed on stator core 61. Then, similar coils 62 are each formed on each tooth 61b, and coils 62 are electrically connected to each other in a predetermined connection pattern, so that coil assembly 64 shown in FIG. 10 is completed.

As shown in FIG. 9, in coil assembly 64 formed as described above, coil 62 has coil ends 62a protruding from stator core 61 toward both sides in shaft direction X. On the other hand, as shown in FIG. 6, a part, of each coil 62, other than coil ends 62a is included in slot 61c of stator core 61. Further, as shown in FIGS. 6 and 9, in order to electrically connect coils 62 to each other, transition wires 62b for connecting between coils 62 are disposed, between teeth 61b, on an outer periphery of an outer peripheral wall 63b of each insulator 63 or on other places.

In this case, in a motor including above-described coil assembly 64, if by any chance, a safety protection function for preventing an excessive current from flowing through coils 62 does not normally operate, the excessive current will flow through coils 62. Then, coils 62 or transition wires 62b generate heat and heat up to extremely high temperatures. As a result, a layer short as a short circuit between winding wires can occur in coils 62, and a spark can be generated due to the layer short. Further, the generated spark can ignite gas generated from insulator 63 and the like, and fire can be generated. There is a high possibility that such a problem may arise particularly with above-mentioned coil ends 62a and transition wires 62b because coil ends 62a and transition wires 62b protrude from stator core 61.

To address this issue, in a similar manner as in the first exemplary embodiment, also in the present exemplary embodiment, metallic inner cover 66, which is a metal member, is disposed as a fire countermeasure on the outer side of coil assembly 64, as shown in FIG. 11. Coil assembly 64 including metallic inner cover 66 is provided in the molding resin. As shown in FIGS. 9 and 10, metallic inner cover 66 is a cylinder made of metal having an approximately cylindrical shape and having open ends on both sides. In the present exemplary embodiment, above-described metallic inner cover 66 is disposed to surround the outer side of the outer periphery of coil assembly 64 and to have a predetermined clearance in radial direction Y between the outer periphery of coil assembly 64 and metallic inner cover 66.

Metallic inner cover 66 further has small-diameter part 66a and large-diameter part 66b having a larger diameter than small-diameter part 66a, as shown in FIG. 10.

Large-diameter part 66b faces coil ends 62a, on one side, of coil ends 62a protruding on both sides in shaft direction X in such a manner that large-diameter part 66b surrounds such coil ends 62a on one end over circumferential direction Z. Small-diameter part 66a faces stator core 61 to surround an outer peripheral surface of stator core 61 over circumferential direction Z.

Further, in the present exemplary embodiment, as shown in FIG. 10, on a part of, small-diameter part 66a, in the circumferential direction, there is provided protruding part 66c protruding outward in the radial direction such that lead wire 67 connecting above-mentioned brackets 35, 65 to each other can be put under protruding part 66c.

In other words, the present configuration has gap part 616, which is a gap; and in the gap, lead wire 67, which is an electric wire, is disposed between stator core 61 and metallic inner cover 66. This gap part 616 is formed by protruding part 66c that protrudes from a surface of metallic inner cover 66 in the outer peripheral direction.

In order to make it possible to fit this small-diameter part 66a on the outer periphery of stator core 61, an inner diameter of small-diameter part 66a is made approximately equal to an outer diameter of stator core 61. Specifically, as shown in FIG. 6, a plurality of protrusions 61p are formed on the outer peripheral surface of stator core 61 equidistantly in circumferential direction Z. Small-diameter part 66a of metallic inner cover 66 has an inner diameter of such a size that an inner peripheral surface of this small-diameter part 66a is in contact with a top end of each protrusion 61p.

Further, a dimension of small-diameter part 66a in shaft direction X is also made approximately equal to a dimension of stator core 61 in shaft direction X. When metallic inner cover 66 is fit on coil assembly 64 such that the top end of each protrusion 61p of stator core 61 and an inner peripheral surface of small-diameter part 66a of metallic inner cover 66 come into contact with each other, metallic inner cover 66 is simply fixed to coil assembly 64 temporarily as shown in FIG. 11. Further, as shown in FIGS. 6 and 9, in the state where metallic inner cover 66 is temporarily fixed to coil assembly 64, there is small space 616 between the outer peripheral surface of stator core 61 and the inner peripheral surface of small-diameter part 66a except protrusion 61p and the part in which lead wire 67 is disposed, and this space 616 is also filled with resin at the time of molding.

Further, as shown in FIG. 9, a dimension of large-diameter part 66b in shaft direction X is greater than a dimension of coil end 62a in shaft direction X. In metallic inner cover 66, above-described large-diameter part 66b is provided only on one side, of small-diameter part 66a, in shaft direction X. When above-described metallic inner cover 66 is attached to coil assembly 64, large-diameter part 66*b* of metallic inner cover 66 is disposed to surround coil ends 62*a* and transition wires 62*b* on one side in shaft direction X.

Note that in FIG. 9, in order to more clearly illustrate the placement of this metallic inner cover 66, insulators 63, coil ends 62*a*, transition wires 62*b*, and the like are separately shown as follows, too. Specifically, in shaft direction X in FIG. 9, on one side of stator core 61 there are disposed insulator 63B, coil end 62*a*B, and transition wire 62*b*B. In the same way, the drawing shows that in shaft direction X, on the other side, which is opposite side of the one side, there are disposed insulator 63T, coil end 62*a*T, and transition wire 62*b*T.

That is, as shown in FIG. 9, metallic inner cover 66 is disposed such that large-diameter part 66*b* surrounds insulator 63B, coil end 62*a*B, and transition wire 62*b*B. On the other hand, any of insulator 63T, coil end 62*a*T, and transition wire 62*b*T is not surrounded by metallic inner cover 66.

Further, in the present exemplary embodiment, as shown in FIG. 9, on the side, where insulator 63B is disposed, there is disposed terminal cap 36 including pin 37. Specifically, in outer peripheral wall 63*b* of insulator 63B there is formed pin attachment groove 63*d* such that pin 37 can be attached in pin attachment groove 63*d*. Pin 37 is attached in this pin attachment groove 63*d*, and the members on the side of insulator 63B are disposed such that terminal cap 36 is put on the members from above.

In particular, to prevent the positional relationship among coil assembly 64, metallic inner cover 66, and terminal cap 36 as shown in FIG. 9 from being displaced at the time of, for example, molding, the present exemplary embodiment has a configuration further including the following characteristic parts.

First, on an outer periphery of each of insulators 63T located on the lower part in the drawing, there are formed positioning parts 63*e*, which are not included in insulator 63B located on the upper part in the drawing. As shown in FIG. 9, when insulator 63T is attached to stator core 61, positioning parts 63*e* protrude further in the outer peripheral direction in radial direction Y than the outer peripheral surface of stator core 61. Since insulator 63T has positioning parts 63*e*, when metallic inner cover 66 is attached, the end part of small-diameter part 66*a* comes into contact with those positioning parts 63*e*, and metallic inner cover 66 is limited in movement in shaft direction X. As described above, these positioning parts 63*e* uniquely determine the positional relationships between small-diameter part 66*a* and stator core 61 and between large-diameter part 66*b* and insulator 63B.

Further, in the present exemplary embodiment, to maintain the positional relationship as shown in FIG. 9, terminal cap 36 disposed near insulator 63B is also used. In the present exemplary embodiment, as shown in FIG. 10, terminal cap 36 positions pins 37 to be used as electric connection terminals. Terminal cap 36 is disposed in contact with the end part of large-diameter part 66*b* of metallic inner cover 66.

In particular, terminal cap 36 has terminal boards 361, side walls 362, and cap protrusions 363. Terminal boards 361 are disposed to face the end face of stator core 61, and pins 37 are attached to terminal boards 361. Side walls 362 extend, in shaft direction X, from outer peripheral sides of terminal boards 361 toward stator core 61. Cap protrusions 363 protrude further in the outer peripheral direction than outer peripheries of the terminal boards 361.

Cap protrusions 363 are disposed to be in contact with an annular end part of large-diameter part 66*b* of metallic inner cover 66.

Figure 12:
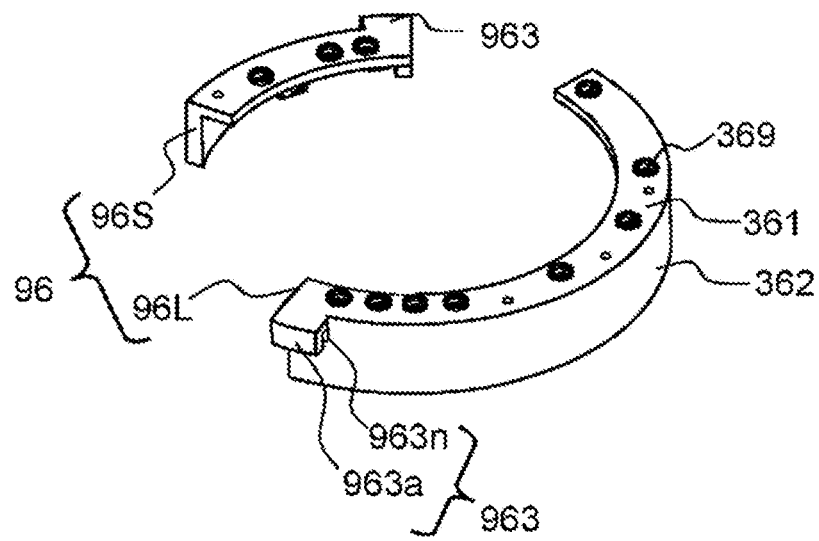
FIG. 12 is a perspective view of a terminal cap of another configuration example of the molded motor in the third exemplary embodiment.

Further, as shown in FIG. 12, cap protrusions 963 each further have shaft protrusion 963*a* that protrudes, along the side wall, from an outer peripheral side of cap protrusion 963 toward stator core 61.

On an outer peripheral surface of terminal cap 96 there are provided a plurality of shaft protrusions 963*a* at predetermined intervals in the circumferential direction.

A detailed description will be given below with reference to the drawings. As shown in FIG. 10, terminal cap 36 is constituted by two terminal caps of larger terminal cap 36L and smaller terminal cap 36S. Terminal cap 36L and terminal cap 36S are disposed to be approximately opposed to each other inside large-diameter part 66*b* of metallic inner cover 66. Further, each part of terminal cap 36 includes terminal board 361, side wall 362, and cap protrusion 363.

As shown in FIG. 10, each terminal board 361 constitutes a circular arc-shaped plane having constant width and being located along with large-diameter part 66*b* of metallic inner cover 66. Terminal cap 36 is disposed such that such terminal boards 361 are parallel to the end face of stator core 61. In each terminal board 361 there are formed a plurality of pin holes 369, and as mentioned above, pins 37 attached to insulator 63B penetrate through pin holes 369 and protrude from terminal board 361.

Each side wall 362 constitutes a curved surface that extends from the outer peripheral side of terminal board 361 perpendicularly to terminal board 361. Terminal cap 36 is disposed such that such side walls 362 are along with an inner periphery of large-diameter part 66*b*, being in contact with the inner periphery of large-diameter part 66*b*. In this case, in metallic inner cover 66 according to the present exemplary embodiment, large-diameter part 66*b* is formed to have a diameter larger than the diameter of small-diameter part 66*a*. Therefore, large-diameter part 66*b* is attached to stator core 61 with a sufficient insulation distance between large-diameter part 66*b* and pins 37. In addition, when terminal cap 36 is disposed according to the present exemplary embodiment, side walls 362 made of an insulating material are located between large-diameter part 66*b* and pins 37, which are both electrically conductive. That is, in the present exemplary embodiment, by providing side walls 362 on terminal cap 36, contact between large-diameter part 66*b* and pins 37 is prevented, and in addition, insulation distances between large-diameter part 66*b* and pins 37 are secured with some margin.

Cap protrusions 363 partially protrude further in the outer peripheral direction than outer peripheries of terminal boards 361. As shown in FIG. 9, terminal cap 36 is disposed such that above-described cap protrusions 363 are in contact with the annular end part of large-diameter part 66*b* of metallic inner cover 66. That is, in the present exemplary embodiment, with respect to metallic inner cover 66, cap protrusion 363 of terminal cap 36 is used together with positioning parts 63*e* to restrict the position in the shaft direction X, so that positional displacement of metallic inner cover 66 is prevented. In addition to this, in the present exemplary embodiment, as shown in FIG. 10, terminal cap 36L and terminal cap 36S each including side wall 362 are disposed to be approximately opposed to each other. With this configuration, even when metallic inner cover 66 acts to move in radial direction Y, side wall 362 functions to prevent the movement. As described above, in the present exemplary embodiment, positioning parts 63*e* are provided on insulators 63T, and side walls 362 and cap protrusions 363 are provided on terminal cap 36. This configuration restricts the position of metallic inner cover 66, thus reduces influence of a flow of resin and a molding pressure at the time of molding, and therefore improves maintenance accuracy of the positional relationship as shown in FIG. 9.

Note that to restrict the position of metallic inner cover 66 and thus to improve the maintenance accuracy, another configuration may be employed.

For example, FIG. 12 is a perspective view of terminal cap 96, which is an example of an alternative configuration of terminal cap 36. Also FIG. 12 shows an example in which terminal cap 96 is constituted by two terminal caps of larger terminal cap 96L and smaller terminal cap 96S. Further FIG. 13 is a cross-sectional view showing a positional relationship among coil assembly 64, metallic inner cover 66, and this terminal cap 96.

Figure 13:
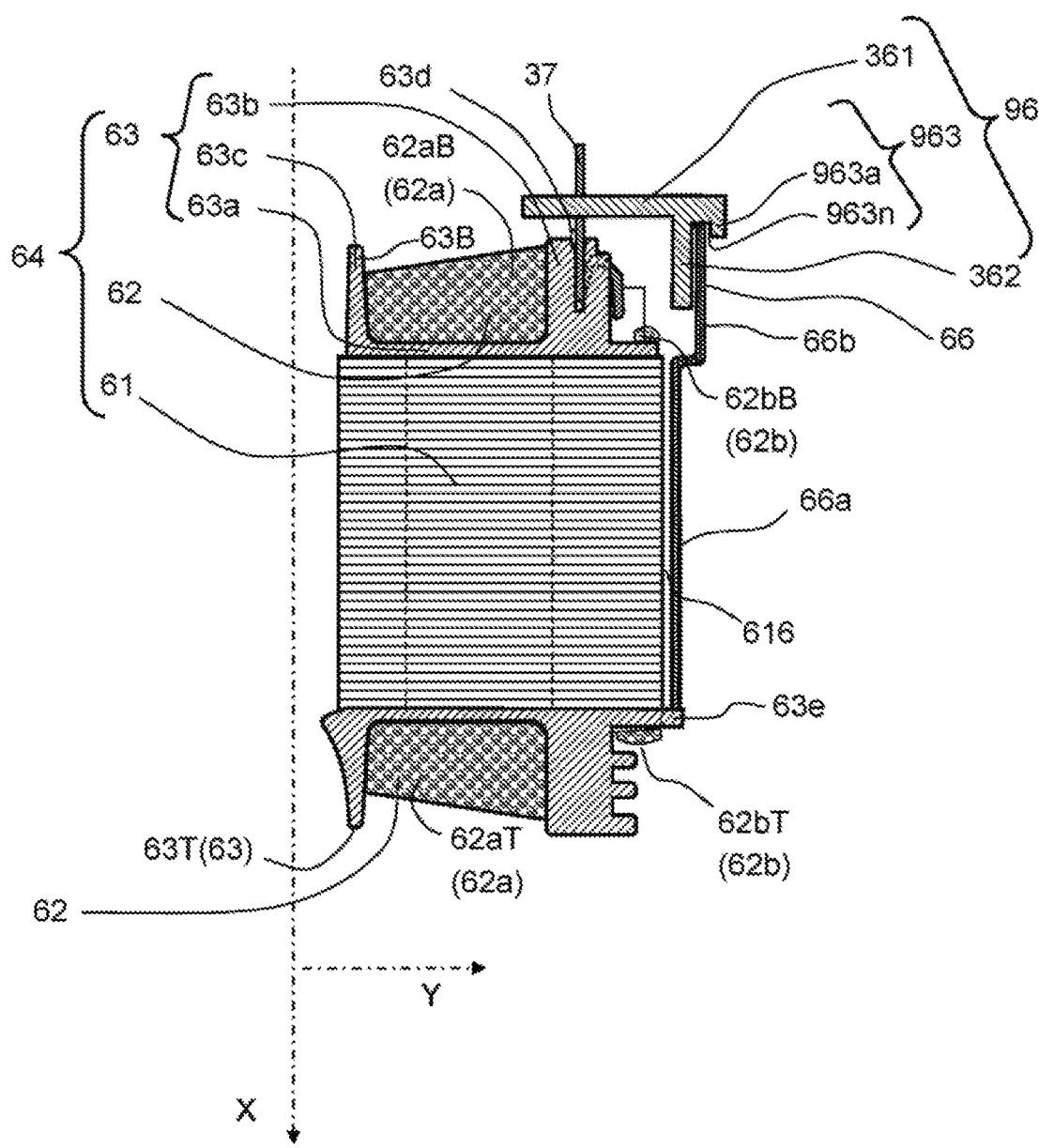
FIG. 13 is a cross-sectional view showing a positional relationship among the coil assembly, the metallic inner cover, and the terminal cap of another configuration, of the molded motor in the third exemplary embodiment.

As shown in FIGS. 12 and 13, terminal cap 96 roughly has a configuration including cap protrusions 963 in each of which groove part 963n is formed in cap protrusion 363 of terminal cap 36 shown in FIG. 9. In more detail, this cap protrusion 963 includes shaft protrusion 963a and groove part 963n. Shaft protrusion 963a protrudes from the outer periphery of cap protrusion 963, along shaft direction X and parallel to side wall 362. With this configuration, groove part 963n, which is a space like a groove, is formed between side wall 362 and shaft protrusion 963a.

In the configuration shown in FIG. 13, terminal cap 96 is disposed such that the annular end part of large-diameter part 66b of metallic inner cover 66 is put in groove part 963n. Thus, with such a configuration, the annular end part of large-diameter part 66b is sandwiched between side wall 362 and shaft protrusion 963a. Therefore, even when metallic inner cover 66 acts to move in radial direction Y, the above configuration prevents more strongly the movement than the configuration shown in FIG. 9. As described above, terminal cap 96 shown in FIG. 12 restricts the position of metallic inner cover 66, thus reduces influence of a flow of resin and a molding pressure at the time of molding, and therefore can further improve the maintenance accuracy of the positional relationship as shown in FIG. 13.

In the above description, as shown in FIG. 10, an example has been described in which cap protrusions 363 are partially provided on terminal cap 36. However, a cap protrusion may be provided over the entire outer peripheral side of terminal cap 36. Further, it is sufficient to provide two cap protrusions 363 or more. For example, three cap protrusions 363 may be separately provided at intervals of 120 degrees in the circumferential direction. In addition, the above description has been given to an example in which terminal cap 36 is divided into two pieces, bigger one and smaller one; however, terminal cap 36 may be made in one annular shape or may be made in two or more pieces.

As described above, large-diameter part 66b of metallic inner cover 66 as a fire countermeasure is disposed on the outer peripheral side of coil end 62aB, outer peripheral wall 63b of insulator 63B, and transition wire 62bB. Therefore, even if fire is caused from coil 62 due to the above-mentioned problem caused by a layer short or the like and the fire is about to spread to the outer peripheral side, of insulator 63B and transition wire 62bB, in the radial direction, the fire and smoke are blocked by large-diameter part 66b of metallic inner cover 66, and the fire and smoke are prevented from coming outside motor 103.

Next, in the present exemplary embodiment, in addition to the fire countermeasure in which metallic inner cover 66 is disposed in stator 60, metallic outer cover 76 is provided as a fire countermeasure. This metallic outer cover 76 is attached to an outer surface of molding resin part 69 of stator 60. In the present exemplary embodiment, this metallic outer cover 76 is attached to an outer side of stator 60 on a side closer to output shaft 21p. In addition, since metallic outer cover 76 is attached as described above, metallic outer cover 76 is disposed, in shaft direction X, at a position on the side of stator core 61 opposite to large-diameter part 66b of metallic inner cover 66.

Figure 14:
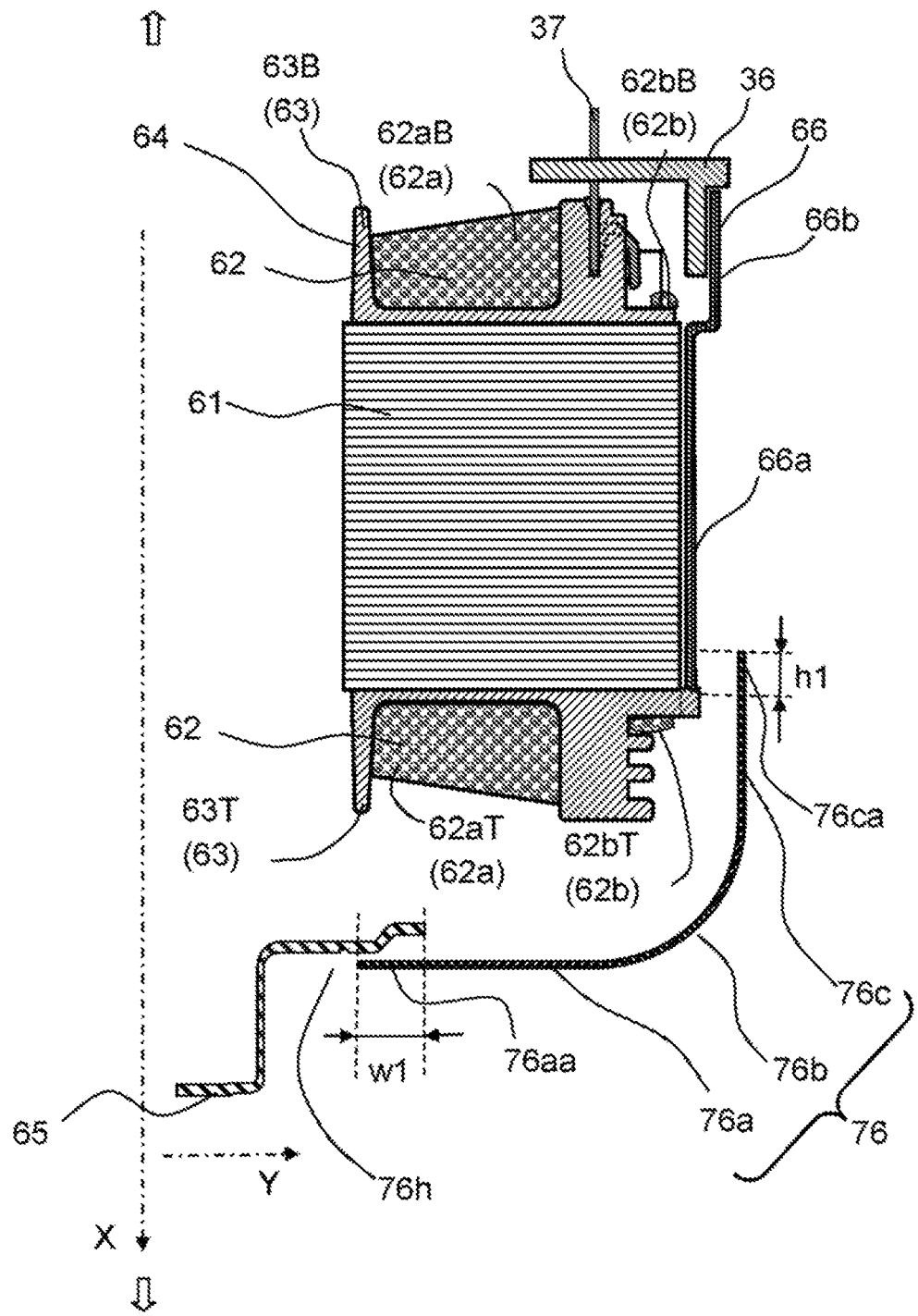
FIG. 14 is a diagram for illustrating a metallic outer cover of molded motor in the third exemplary embodiment.

FIG. 14 is a diagram for describing this metallic outer cover 76. In order to illustrate a positional relationship between this metallic outer cover 76 and other members, FIG. 14 shows, together with this metallic outer cover 76, also coil assembly 64, metallic inner cover 66, second bracket 65, and terminal cap 36 including pin 37. Since metallic outer cover 76 is attached as shown in FIG. 5, metallic outer cover 76 is disposed, in shaft direction X, at a position on the side of stator core 61 opposite to large-diameter part 66b of metallic inner cover 66 as shown in FIG. 14. In this case, as described above, on the opposite side of large-diameter part 66b, insulator 63T, coil end 62aT, and transition wire 62bT are disposed together with second bracket 65 from which output shaft 21p protrudes. Note that a description will be given hereinafter supposing appropriately that in shaft direction X, the side of above-described stator core 61 opposite to large-diameter part 66b of metallic inner cover 66 is defined as an output shaft side, on which output shaft 21p is disposed, and supposing that an opposite side of the output shaft side is defined as an opposite output shaft side.

Metallic outer cover 76 is configured with top surface 76a, curved surface 76b, and cylindrical part 76c and has a hollow cup shape. Top surface 76a of this metallic outer cover 76 has a disk shape and opening part 76h at a center of top surface 76a. Curved surface 76b is curved in a curved surface shape at approximately a right angle from top surface 76a. Cylindrical part 76c extends in a circular cylindrical shape from curved surface 76b and has an opening on an end part side of cylindrical part 76c. Further, in order to make it easy to fit this cylindrical part 76c on an outer periphery of stator 60, an inner diameter of cylindrical part 76c is made approximately equal to an outer diameter of stator 60.

Further, a dimension of metallic outer cover 76 in shaft direction X when metallic outer cover 76 is attached to stator 60 is set to such a dimension that cylindrical part 76c and metallic inner cover 66 can create overlapping part 76ca in shaft direction X. In other words, metallic outer cover 76 is attached at such a position that cylindrical part 76c and stator core 61 can create overlapping part 76ca in shaft direction X when metallic outer cover 76 is attached to stator 60. In the specific example described here, this overlapping part 76ca has dimension h1.

In this manner, in the present exemplary embodiment, on the output shaft side, at least a part of cylindrical part 76c overlaps, as overlapping part 76ca, stator core 61 in shaft direction X. Further, metallic outer cover 76 is disposed with respect to coil assembly 64 such that overlapping part 76ca of cylindrical part 76c surrounds an outer side of the outer periphery of stator core 61, having a predetermined space between the outer periphery of stator core 61 and overlapping part 76ca in radial direction Y. In the above-described positional relationship of metallic outer cover 76 with respect to coil assembly 64, metallic outer cover 76 is attached to stator 60. As a result, on the output shaft side, metallic outer cover 76 surrounds and covers insulators 63T, coil ends 62aT, and transition wire 62bT.

In other words, the motor in the present exemplary embodiment includes metallic outer cover 76, which is a metal member. Metallic outer cover 76 is attached on an outer surface of the molding resin to surround, at least over the circumferential direction, coil ends 62aT, on the other ends, of coil ends 62a protruding on both sides in shaft direction X.

In this manner, coil ends 62aT, insulators 63T, and transition wires 62bT are covered by metallic outer cover 76, which is a fire countermeasure. Therefore, even if fire is caused due to the above-mentioned problem such as a layer short, and the fire is about to spread to the outer peripheral side, of insulator 63T and transition wire 62bT, in radial direction Y, the fire and smoke are blocked by metallic outer cover 76, and the fire and smoke can be prevented from coming outside motor 103.

Further, in the present exemplary embodiment, at least a part of top surface 76a of metallic outer cover 76 overlaps, as overlapping part 76aa, second bracket 65 in radial direction Y. In more detail, a part of top surface 76a on an outer side of an outer periphery of opening part 76h is annular overlapping part 76aa that overlaps, in radial direction Y, a part of second bracket 65 on the outer peripheral side. Further, FIG. 14 shows an example in which this overlapping part 76aa has dimension w1. As described above, in the present exemplary embodiment, since metallic outer cover 76 and second bracket 65 are made to overlap each other on overlapping part 76aa, blocking performance of preventing the fire and smoke caused inside motor 103 from coming outside is improved.

Figure 15A:
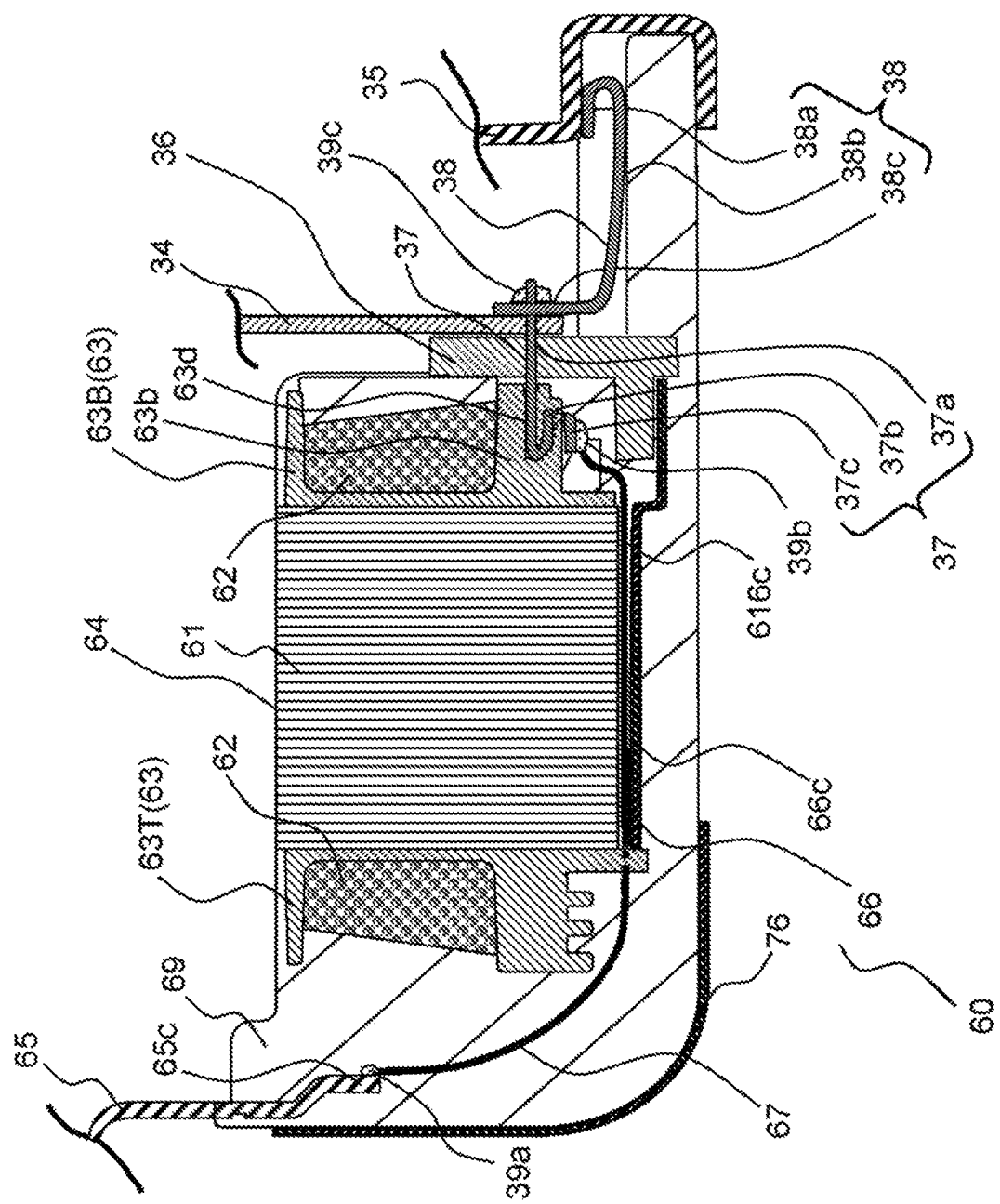
FIG. 15A is a cross-sectional view showing a cross-section of a part, of the stator of the molded motor in the third exemplary embodiment, including a protruding part of the metallic inner cover.
Figure 15B:
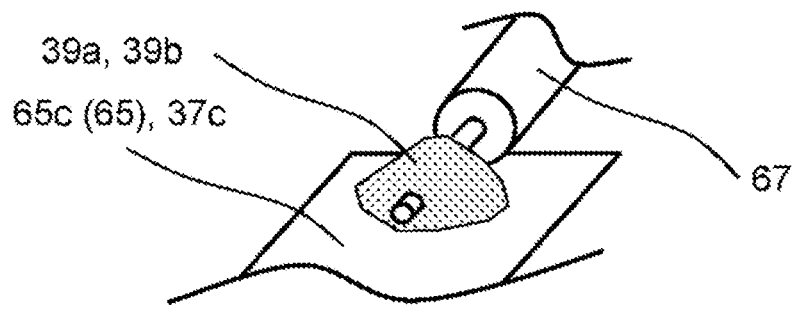
FIG. 15B is an explanatory diagram showing a state where a conductive member used in the molded motor in the third exemplary embodiment is connected.
Figure 15C:
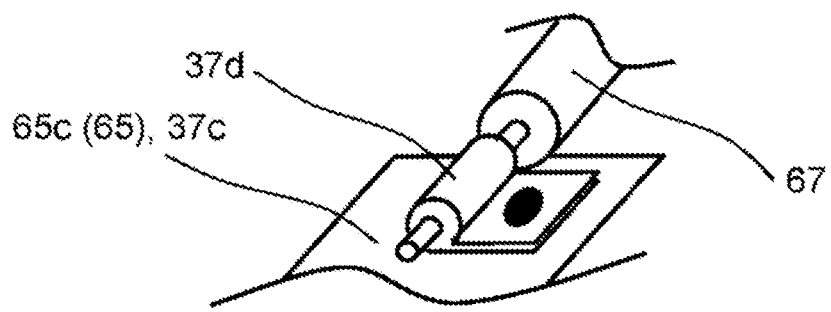
FIG. 15C is an explanatory diagram showing a state where a conductive member used in the molded motor in the third exemplary embodiment is connected in another way.
Figure 15D:
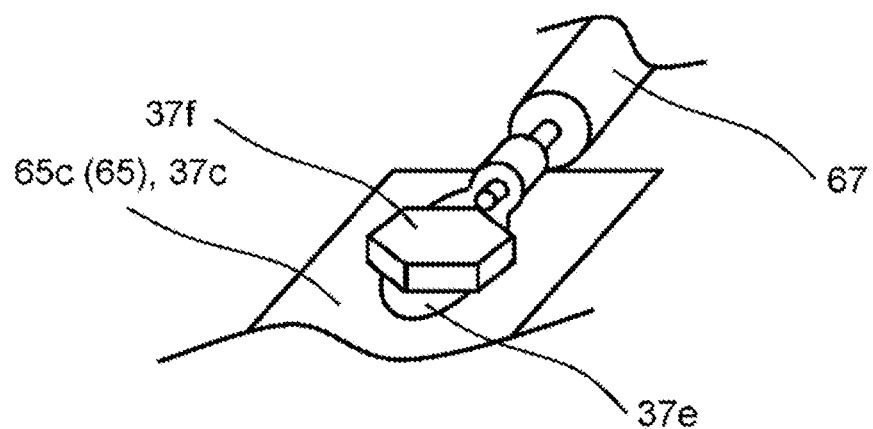
FIG. 15D is an explanatory diagram showing a state where a conductive member used in the molded motor in the third exemplary embodiment is connected in another way.

Next, in the present exemplary embodiment, as mentioned above, first bracket 35 and second bracket 65 are electrically connected to each other with a conductive member to enhance effect of preventing electrolytic corrosion. FIG. 15A is a cross-sectional view showing a cross-section of a part, of stator 60, including protruding part 66c of metallic inner cover 66. FIGS. 15B to 15D are explanatory diagrams each showing how lead wire 67, which is a conductive member used in the motor in the present exemplary embodiment, is connected. As shown in FIG. 15A, first bracket 35 and second bracket 65 are electrically connected to each other with lead wire 67 as a conductive member, pin 37, and pin 38.

Lead wire 67 is a normal electric wire in which a metal conductive wire is covered with an insulating material, and particularly in the present exemplary embodiment, lead wire 67 is put in a space between the outer peripheral surface of stator core 61 and the inner peripheral surface of metallic inner cover 66. Specifically, in the present exemplary embodiment, for example, as shown in FIG. 10, protruding part 66c is provided on metallic inner cover 66. Then, as shown in FIG. 15A, gap part 616c between the outer peripheral surface of stator core 61 and the inner peripheral surface of protruding part 66c is secured as a sufficient space for lead wire 67 to be put in. Further, as shown in FIG. 15B, in the present exemplary embodiment, on an end part of the outer periphery of second bracket 65, connecting part 65c of second bracket 65 is soldered, with solder 39a, to a conductive wire part that is an end part of lead wire 67 and is exposed, so that one end of lead wire 67 is electrically connected to second bracket 65.

As shown in FIG. 15A, this lead wire 67 is inserted into gap part 616c from an opening that is open near insulator 63T. Further, through the opening that is open near insulator 63B, the other end of lead wire 67 is drawn out from gap part 616c. The other end of lead wire 67 that is drawn out is led around in the vicinity of pin 37 attached to insulator 63B.

Note that the one end of lead wire 67 and connecting part 65c of second bracket 65 can be electrically connected in the following forms. Specifically, as shown in FIG. 15C, attachment member 37d is attached to the conductive wire part, which is an end part of lead wire 67 and is exposed. Attachment member 37d is connected to connecting part 65c of second bracket 65 by fusing. Fusing is also referred to heat swaging. In the above-described manner, lead wire 67, which is a conductive member, is electrically connected to second bracket 65.

Alternatively, as shown in FIG. 15D, connection terminal 37e is attached to the conductive wire part, which is an end part of lead wire 67 and is exposed. By an attaching part of connection terminal 37e being swaged, the attaching part of connection terminal 37e is fixed to the exposed conductive wire part. Connection terminal 37e is connected to connecting part 65c of second bracket 65 with bolt 37f. In the above-described manner, lead wire 67, which is a conductive member, is electrically connected to second bracket 65.

Other than the above, a swage part may be formed on an end part of second bracket 65 so that a conductive wire part, which is an end part of lead wire 67 and is exposed, can be press-attached to the swage part.

Further, as shown in FIGS. 15B to 15D, the above-mentioned structures of connecting the lead wire 67 can also be used for connecting the other end of lead wire 67 to pin 37, instead of connecting the one end of lead wire 67 to second bracket 65. Specifically, connecting part 37c of pin 37 instead of connecting part 65c of second bracket 65 and a conductive wire part, which is an end part of lead wire 67 and is exposed, are connected to each other.

As shown in FIG. 15A, pin 37 is formed by a punching work and bending work of a metallic sheet and is configured to include: extending part 37a extending in a holding pin shape; insertion part 37b having been subjected to bending or the like; and connecting part 37c extending in a plate shape. Insertion part 37b is provided for attachment to insulator 63B, extending part 37a is provided to be used as a connection terminal on terminal cap 36, and connecting part 37c is provided for connection to lead wire 67. Specifically, by inserting this insertion part 37b into pin attachment groove 63d formed in outer peripheral wall 63b of insulator 63B, pin 37 is attached to insulator 63B. Then, extending part 37a protrudes from insulator 63B in shaft direction X. Further, connecting part 37c is exposed from insulator 63B in radial direction Y as shown in, for example, FIG. 11, and protrudes in circumferential direction Z. As show in FIGS. 15A and 15B, connecting part 37c is soldered to a conductive wire part, which is an end part of lead wire 67 and is exposed, with solder 39b, so that the other end of lead wire 67 is electrically connected to pin 37.

As shown in FIG. 15A, pin 38 is also formed by a punching work and bending work of a metallic sheet and is configured to include: extending part 38b that is extended at a central part; bent part 38a that is bent back on one end part of extending part 38b; and connecting part 38c that is on the other end part of extending part 38b and has a plate shape. Connecting part 38c is provided for connection to extending part 37a of pin 37, and bent part 38a is provided for connection to first bracket 35. In this case, as shown in the drawing, circuit board 34 is attached to coil assembly 64 completed through molding, so that pin 37 protrudes from circuit board 34. Pin 38 is electrically connected to pin 37 protruding from this circuit board 34. That is, in the present exemplary embodiment, as shown in FIG. 15A, connecting part 38c of pin 38 is attached to pin 37 protruding from circuit board 34 and is soldered with solder 39c, so that pin 38 protrudes from circuit board 34 toward the opening in the inner space of stator 60. Then, when first bracket 35 is attached like putting a lid on the opening of stator 60, first bracket 35 and pin 38 come into contact with each other at sufficient strength by resilience of bent part 38a of pin 38. In the above-described manner, first bracket 35 is electrically connected to pin 38.

In the present exemplary embodiment, lead wire 67 is put in gap part 616c between stator core 61 and metallic inner cover 66. That is, for example, when lead wire 67 is put on the outer side of metallic inner cover 66, a problem may occur that lead wire 67 comes off at the soldered part due to a pressure applied to the whole of lead wire 67 by a large amount of resin at the time of molding. In contrast, when lead wire 67 is put in gap part 616c as in the present exemplary embodiment, pressure is applied partially to lead wire 67 by a little amount of resin at the time of molding. Therefore, it is possible to reduce a possibility of occurrence of a problem such as coming-off of the soldered part, so that reliability can be improved.

In addition, in the case where lead wire 67 is put on the outer side of metallic inner cover 66, lead wire 67 moves, for example, at the time of molding, and a position of lead wire 67 is not fixed. As a result, stray capacitance between stator core 61 and lead wire 67 fluctuates largely. In constant, when lead wire 67 is put in gap part 616c as in the present exemplary embodiment, the position of lead wire 67 can be approximately in a constant range, and it is thus possible to reduce fluctuation in the stray capacitance between stator core 61 and lead wire 67. Note that, as mentioned above, the shaft voltage causing electrolytic corrosion is caused by high frequency signals that are generated from stator core 61 and are transmitted to shaft bearings 30A, 30B through stray capacitance and the like. In contrast, in the present exemplary embodiment, since it is possible to reduce the fluctuation in the stray capacitance of lead wire 67, it is possible to reduce fluctuation of voltages generated, on outer rings 30o of shaft bearings 30A, 30B both electrically connected to lead wire 67, due to the high frequency signals from stator core 61. Therefore, it is also possible to reduce the fluctuation in the shaft voltage that causes electrolytic corrosion, and it is possible to accurately reduce occurrence of electrolytic corrosion.

As described above, the present exemplary embodiment can prevent electrolytic corrosion on shaft bearings 30A, 30B in molded motor 103 in which stator 60 is covered with molding resin, and can prevent fire from leaking outside the motor even when an excessive current flows through coils 62 wound on stator core 61.

Figure 16A:
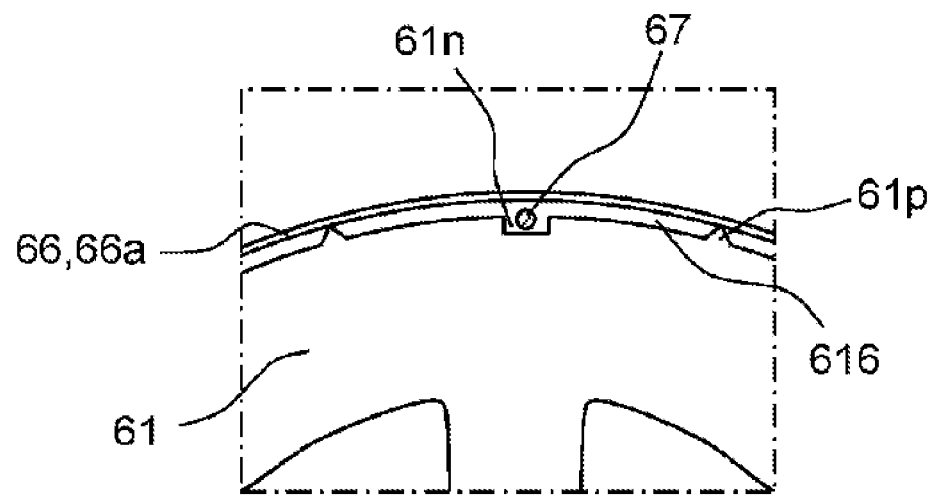
FIG. 16A is a diagram showing another configuration example of how both brackets of the molded motor of the third exemplary embodiment are electrically connected to each other.
Figure 16B:
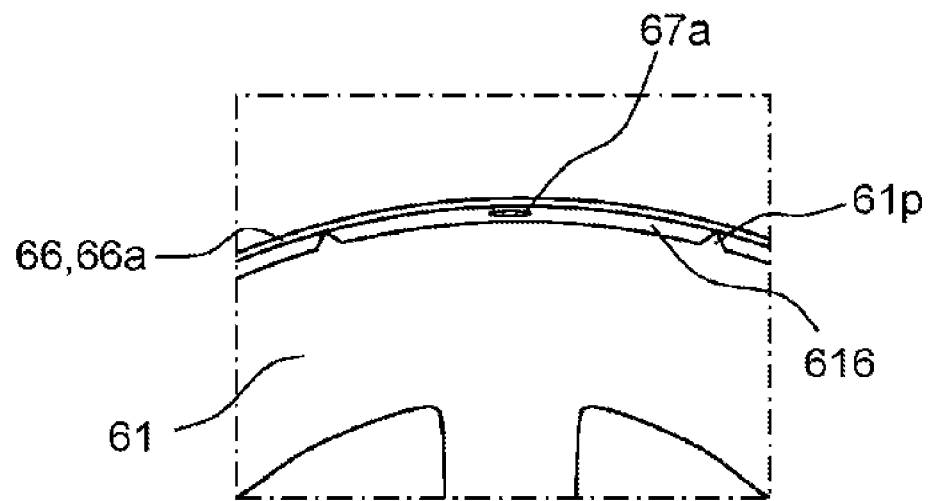
FIG. 16B is a diagram showing still another configuration example of how both brackets of the molded motor of the third exemplary embodiment are electrically connected to each other.

Note that in the present exemplary embodiment, a configuration example is described in which protruding part 66c is provided on metallic inner cover 66, and lead wire 67 passes through between the outer peripheral surface of stator core 61 and the inner peripheral surface of metallic inner cover 66. However, other configurations can be employed to pass lead wire 67 through between the outer peripheral surface of stator core 61 and the inner peripheral surface of metallic inner cover 66. FIGS. 16A and 16B show such other configurations.

First, FIG. 16A illustrates a configuration example in which groove 61n is formed to extend in shaft direction X in a surface of stator core 61, and this groove 61n is used. That is, groove part 61n is formed in stator core 61 as gap part 616. Also with this configuration, by using a space formed between small-diameter part 66a of metallic inner cover 66 and this groove 61n, lead wire 67 can be put in a space between the outer peripheral surface of stator core 61 and the inner peripheral surface of metallic inner cover 66.

Further, FIG. 16B illustrates a configuration example in which lead wire 67a that is a long extending flat metal member is used instead of lead wire 67. Also with this configuration, it is possible to use space 616 between the outer peripheral surface of stator core 61 and the inner peripheral surface of small-diameter part 66a. That is, lead wire 67a can be passed through between the outer peripheral surface of stator core 61 and the inner peripheral surface of metallic inner cover 66.

As described above, motor 103 of the present exemplary embodiment includes metallic inner cover 66 and metallic outer cover 76 each serving as a fire countermeasure.

As mentioned above, by molding stator core 61 and this metallic inner cover 66 attached to a side surface of stator core 61, stator 60 is configured to include molding resin part 69 integrating these members. In above-described stator 60, on the opposite output shaft side, large-diameter part 66b of metallic inner cover 66 is disposed to surround insulators 63B, coil ends 62aB, and transition wires 62bB. Therefore, on the opposite output shaft side, large-diameter part 66b of metallic inner cover 66 can block the fire and smoke caused inside motor 103.

Further, in the present exemplary embodiment, metallic outer cover 76 is fit on the outer periphery of stator 60 in the above-described manner. With this arrangement, on the output shaft side, metallic outer cover 76 is disposed to cover insulators 63T, coil ends 62aT, and transition wires 62bT. Therefore, on the output shaft side, metallic outer cover 76 can block the fire and smoke caused inside motor 103.

In the present exemplary embodiment, molding resin part 69 covers the whole of insulators 63 and coil ends 62a in addition to the whole of metallic inner cover 66 while only inner peripheral surface of each tooth 61b is exposed. As a result, the above-described fire protection measures are taken, and strength of holding coil assembly 64 in stator 60 is also sufficiently secured.

Further, in the present exemplary embodiment, in rotor 80, inner resin part 85b of rotor resin part 85 is made to function as a dielectric layer to increase the impedance on the side of rotor 80 to become close to the impedance on the side of stator 60, so that occurrence of electrolytic corrosion on shaft bearings 30 is reduced. In addition, by employing the configuration in which first bracket 35 and second bracket 65 are electrically connected to each other with a conductive member, both of brackets 35 and 65 are made to have the same potential, and the voltages on the outer ring sides of the pair of shaft bearings 30A, 30B are thus made the same, so that an inhibiting effect of electrolytic corrosion is further improved.

As described above, also the present exemplary embodiment can prevent electrolytic corrosion on shaft bearings 30A, 30B in molded motor 103 in which stator 60 is covered with molding resin part 69, and can prevent fire from leaking outside the motor even when an excessive current flows through coils 62 wound on stator core 61.

Fourth Exemplary Embodiment

Figure 17:
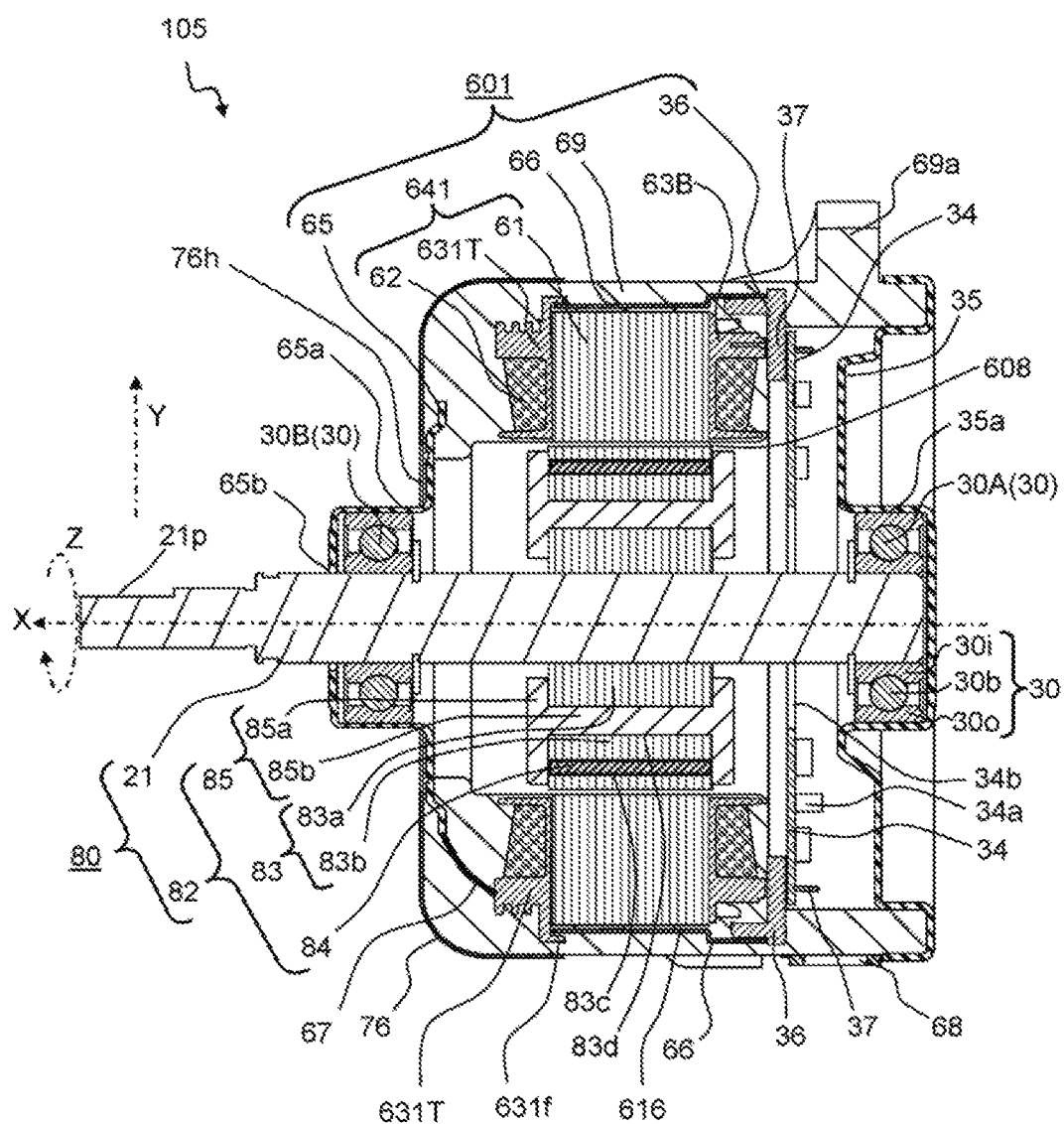
FIG. 17 is a cross-sectional view of a molded motor in a fourth exemplary embodiment of the present invention.
Figure 18:
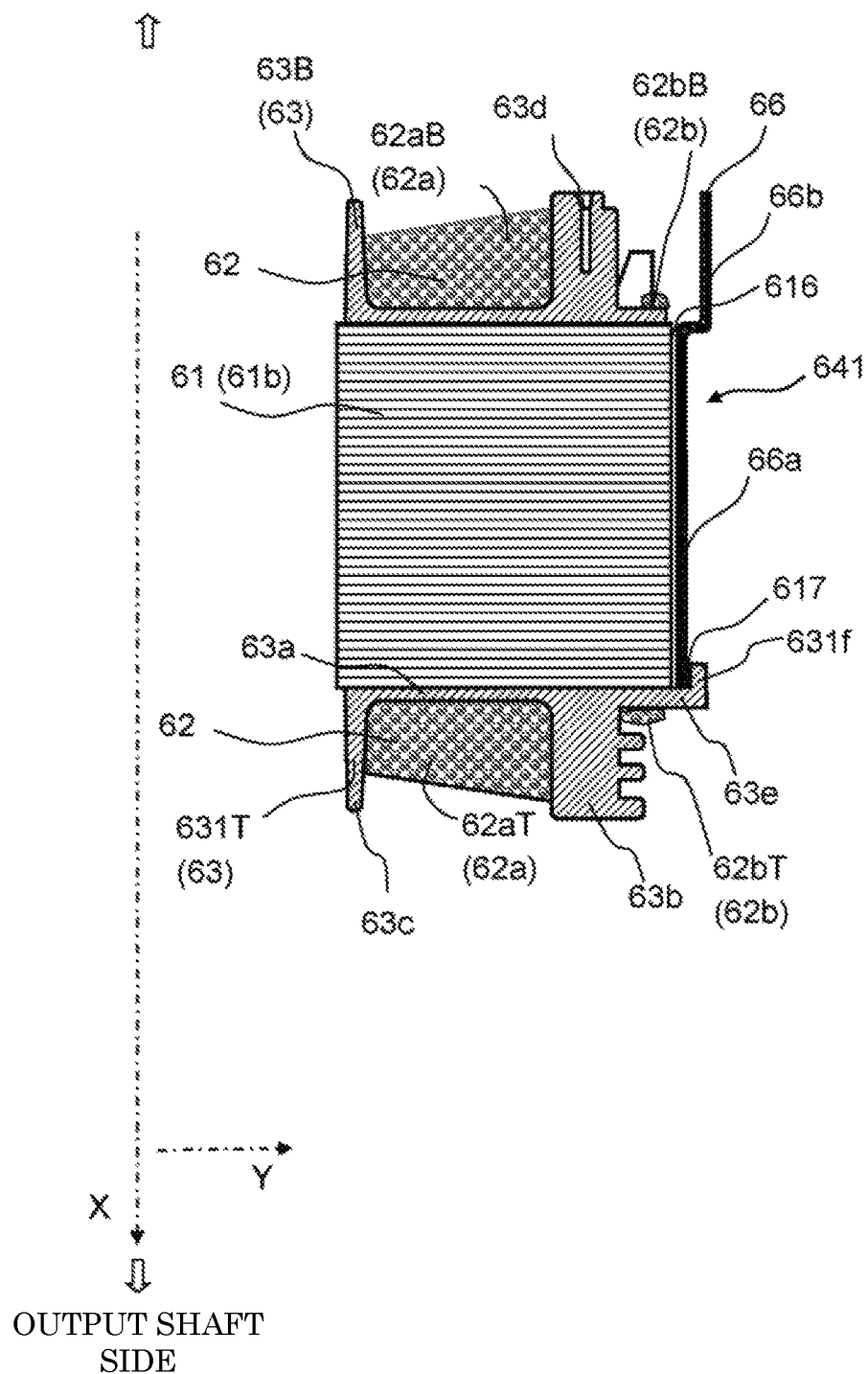
FIG. 18 is a cross-sectional view of a coil assembly and a metallic inner cover of the molded motor in the fourth exemplary embodiment.
Figure 19:
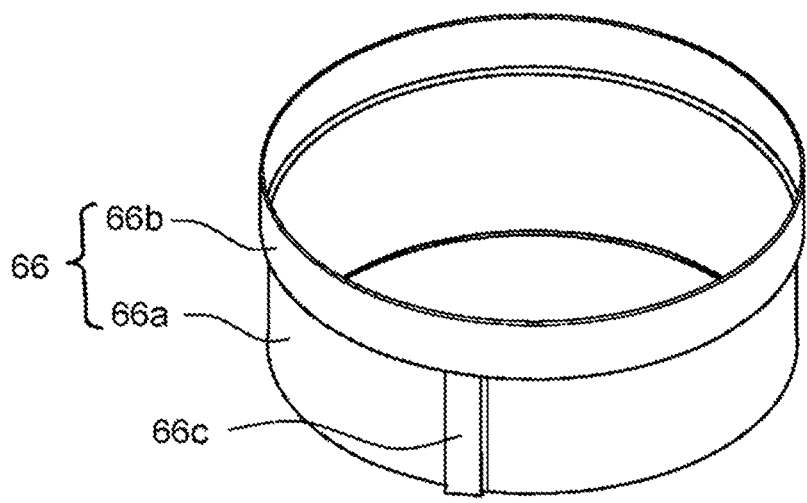
FIG. 19 is an exploded perspective view of the coil assembly and the metallic inner cover of the molded motor in the fourth exemplary embodiment.
Figure 19:
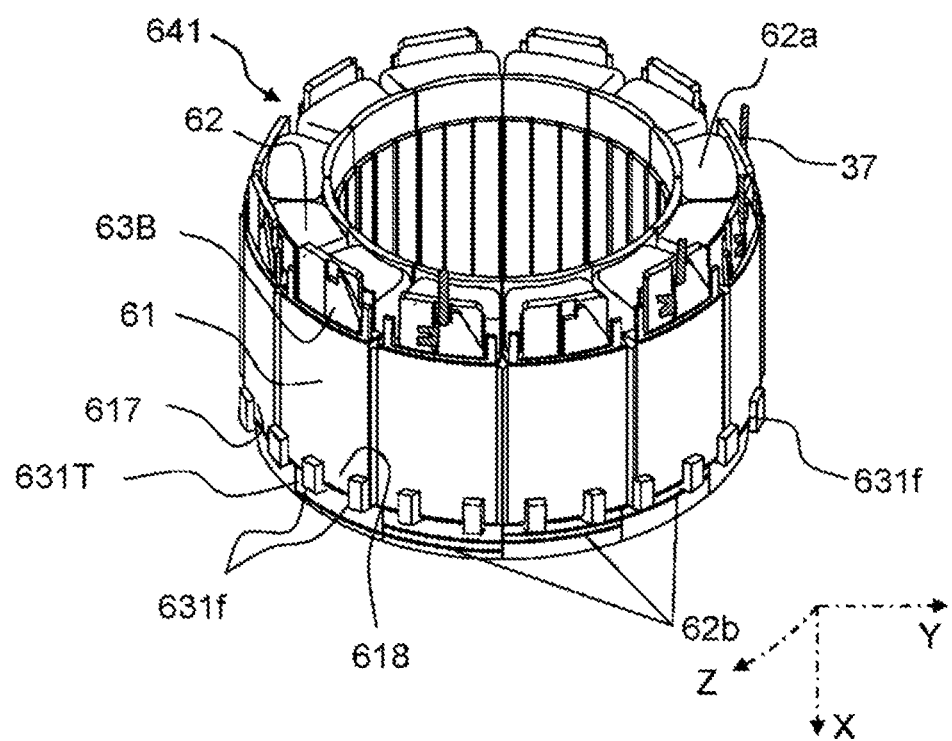
Figure 20:
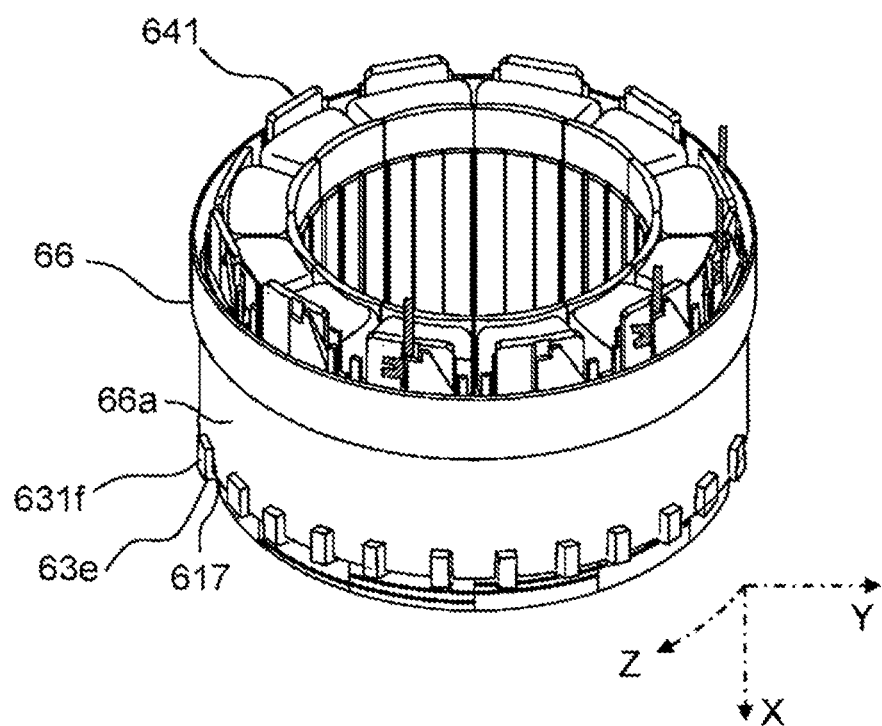
FIG. 20 is a configuration diagram of the metallic inner cover disposed on an outer periphery of the coil assembly of the molded motor in the fourth exemplary embodiment.

FIG. 17 is cross-sectional view of molded motor (hereinafter, appropriately referred to as a motor) 105 in a fourth exemplary embodiment of the present invention. FIG. 18 is a cross-sectional view of coil assembly 641 and metallic inner cover 66 of motor 105 in the fourth exemplary embodiment. FIG. 19 is an exploded perspective view of coil assembly 641 and metallic inner cover 66. Further, FIG. 20 is a diagram of a configuration in which metallic inner cover 66 is disposed on an outer periphery of coil assembly 641.

Compared with the third exemplary embodiment shown in FIGS. 5 and 9 and the like, motor 105 in the present exemplary embodiment includes insulator 631T that is made by deforming insulator 63T in the third exemplary embodiment. Specifically, as shown in FIG. 17, motor 105 includes stator 601 including molding resin part 69 that integrates the following members: coil assembly 641 including insulator 631T disposed near second bracket 65; and metallic inner cover 66 attached to coil assembly 641. Note that the other configurations and operations are identical to those of the third exemplary embodiment, and the components identical to the components of the third exemplary embodiment are assigned the same reference marks, and the description of the third exemplary embodiment is used.

As shown in FIG. 18, insulator 631T on one side has positioning protrusions 631f protruding along shaft direction X from positioning parts 63e toward stator core 61.

Further, as shown in the drawing, in coil assembly 641 in the present exemplary embodiment, each insulator 63B similar to the insulator in the third exemplary embodiment is disposed on the opposite output shaft side; however, on the output shaft side, on which second bracket 65 is disposed, each insulator 631T is disposed. Insulator 631T corresponds to one tooth 61b in a similar manner as in the third exemplary embodiment and further has positioning protrusions 631f in addition to bottom surface part 63a, outer peripheral wall 63b, inner peripheral wall 63c, and positioning parts 63e. On the output shaft side, when insulator 631T is attached to stator core 61, positioning parts 63e protrude further in the outer peripheral direction in radial direction Y than the outer peripheral surface of stator core 61, as described above. In this state, positioning protrusions 631f protrude from positioning parts 63e along shaft direction X toward stator core 61. In other words, when insulator 631T is attached to an end part on the output shaft side of stator core 61, space 617 is formed between the outer peripheral surface of stator core 61 and positioning protrusions 631f. In the present exemplary embodiment, as shown in FIG. 20, a configuration is employed in which an end part of small-diameter part 66a formed on metallic inner cover 66 is inserted in space 617. In the present exemplary embodiment, it is fully prepared to prevent displacement of metallic inner cover 66 in shaft direction X and radial direction Y by forming these positioning protrusions 631f in addition to positioning parts 63e such that positioning protrusions 631f and positioning parts 63e receive metallic inner cover 66.

By the way, the motor of the present invention is a molded motor as described above, and stator 60 is formed by being integrally molded with molding resin. That is, more specifically, stator 60 is integrally molded by an injection molding method in which coil assembly 64 or 641, metallic inner cover 66, second bracket 65, and terminal cap 36 are provided in a molding die and molten resin melted at a high temperature is injected into the molding die with injection pressure such that air gaps in the molding die are filled with the molten resin. In this step, the injection pressure at which the molten resin is injected to the molding die needs to be significantly high, and higher pressure is applied particularly to small spaces in the molding die. For example, in the case of such a configuration as stator 60 in the third exemplary embodiment, space 616, which is a small space, is between the outer peripheral surface of stator core 61 and the inner peripheral surface of small-diameter part 66a as mentioned above, and very high pressure is applied to this space 616. In addition, metallic inner cover 66 having this small-diameter part 66a is formed of a thin metallic plate, which is sensitive to pressure and is easily deformed, considering weight and size of the motor.

To address this issue, in the present exemplary embodiment, positioning protrusions 631f are provided to be used as a resistance element to reduce the current of the molten resin at the time of injection molding in addition to prevention of the above displacement.

That is, in the case of forming stator 60 shown in the third exemplary embodiment by the above injection molding, molten resin is injected from opening 65b of second bracket 65 in consideration of the shape of stator 60. In the case of the configuration of the third exemplary embodiment, the injected molten resin flows into space 616 between stator core 61 and metallic inner cover 66 through the gaps formed between insulators 63T formed in circumferential direction Z.

In contrast, in the present fourth exemplary embodiment, because positioning protrusions 631f further provided on positioning parts 63e act to inhibit the molten resin flowing into space 616, the pressure applied to an inside of metallic inner cover 66 is reduced.

In particular, positioning protrusion 631f has a shape as follows. Not all the outer peripheral side, in the circumferential direction, of insulator 631T is protruded toward stator core 61, but a plurality of positioning protrusions 631f for one insulator 631T are partially provided on the outer peripheral side of insulator 631T, as shown in FIG. 19. That is, on an outer peripheral surface of insulator 631T on one side, a plurality of positioning protrusions 631f are formed in circumferential direction Z at a predetermined interval. In other words, between the plurality of positioning protrusions 631f of one insulator 631T, there is formed space 618 in the circumferential direction. A width of this space 618 in circumferential direction Z is adjusted to adjust inflow pressure of the molten resin flowing into space 616.

As described above, in the present exemplary embodiment, coil assembly 641 has insulators 631T each having positioning protrusions 631f. Due to the configuration having positioning protrusions 631f as described above, the positional relationship can be improved in the arrangement of metallic inner cover 66 in coil assembly 641. In addition, by adjusting the shape and the like of positioning protrusions 631f, the pressure applied to the inside of metallic inner cover 66 can be adjusted to be reduced, and metallic inner cover 66 can be prevented from being deformed or broken.

Fifth Exemplary Embodiment

Figure 21:
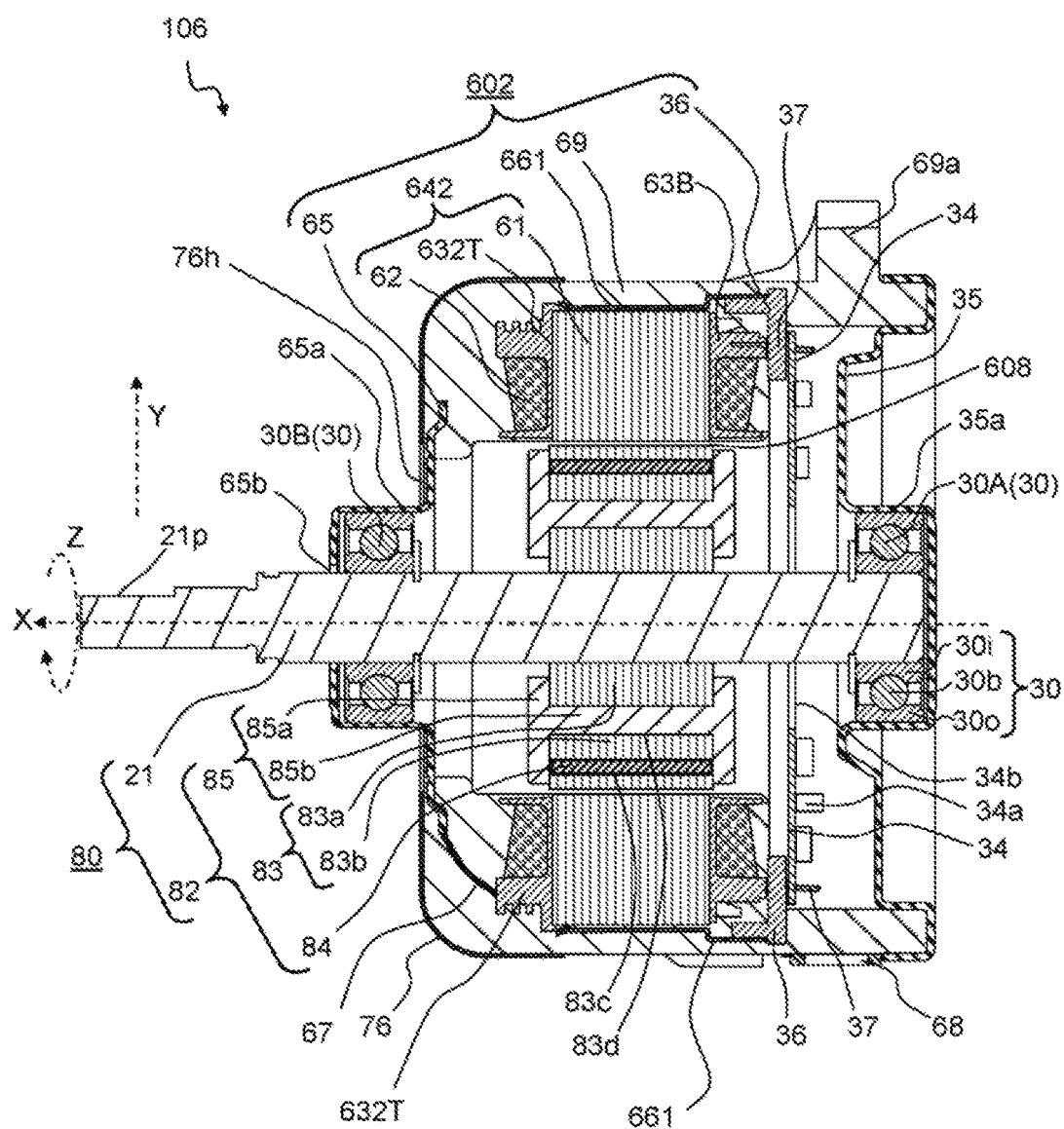
FIG. 21 is a cross-sectional view of a molded motor in the fifth exemplary embodiment of the present invention.
Figure 22:
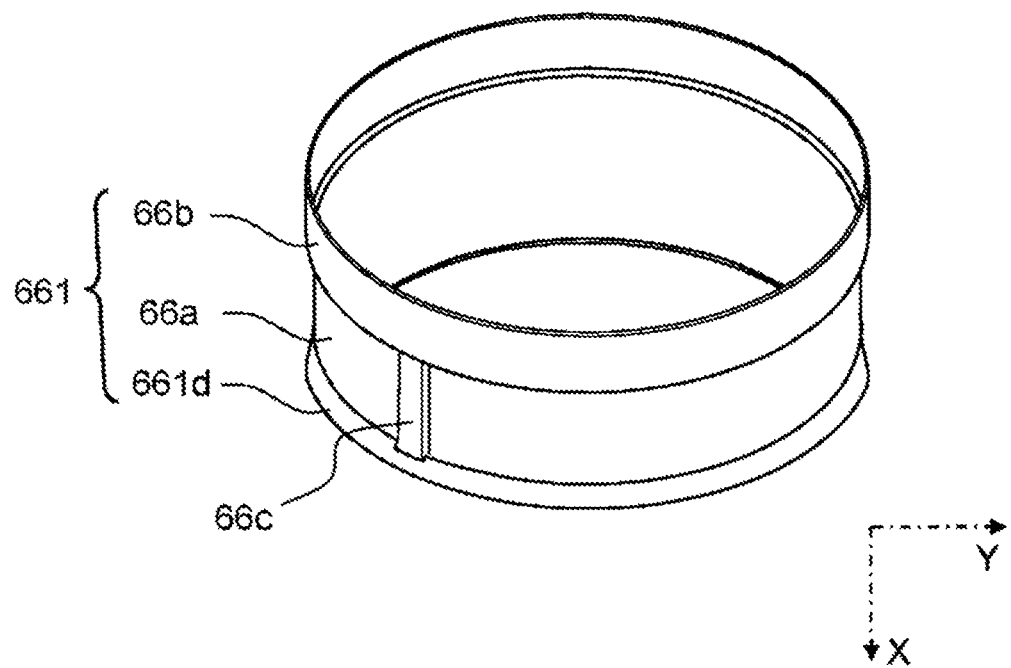
FIG. 22 is a perspective view of a metallic inner cover of the molded motor in the fifth exemplary embodiment.
Figure 23:
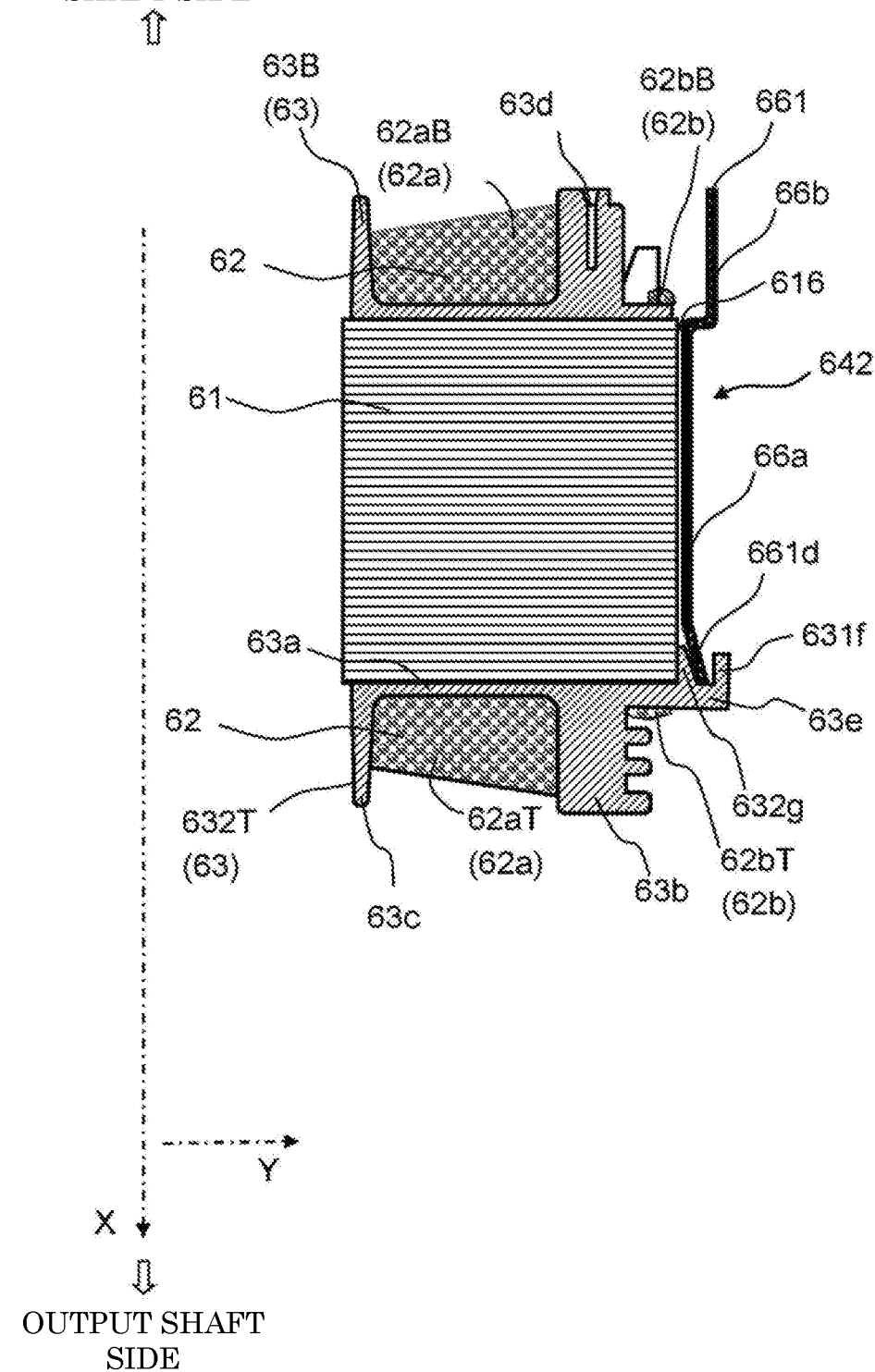
FIG. 23 is a cross-sectional view of the metallic inner cover and the coil assembly of the molded motor in the fifth exemplary embodiment.

FIG. 21 is a cross-sectional view of molded motor (hereinafter, appropriately referred to as a motor) 106 in a fifth exemplary embodiment of the present invention. FIG. 22 is a perspective view of metallic inner cover 661 of motor 106 according to the fifth exemplary embodiment of the present invention. FIG. 23 is a cross-sectional view of metallic inner cover 661 and coil assembly 642 of motor 106 according to the fifth exemplary embodiment of the present invention.

Compared with the third exemplary embodiment shown in FIG. 5, motor 106 in the present exemplary embodiment includes: metallic inner cover 661 that is a modification of metallic inner cover 66 of the third exemplary embodiment; and insulator 632T that is a modification of insulator 63T of the third exemplary embodiment. Specifically, as shown in FIG. 21, motor 106 includes stator 602 including molding resin part 69 that integrates the following members: coil assembly 642 including insulator 632T disposed near second bracket 65; and metallic inner cover 661 attached to coil assembly 642. Note that the other configurations and operations are identical to those of the third and fourth exemplary embodiments, and the identical components are assigned the same reference marks, and the descriptions of the third and fourth exemplary embodiment are used.

First, as shown in FIG. 22, metallic inner cover 661 as a fire countermeasure is also a cylinder made of metal having an approximately cylindrical shape and having open ends on both sides. Further, metallic inner cover 661 further has tapered part 661$d$ as a cover-side tapered part in addition to small-diameter part 66$a$, large-diameter part 66$b$, and protruding part 66$c$ which are similar to those of metallic inner cover 66 of the third exemplary embodiment.

This tapered part 661$d$ is provided on the end part, of small-diameter part 66$a$, opposite to large-diameter part 66$b$. Tapered part 661$d$ has an inverse tapered shape, and a diameter of tapered part 661$d$ becomes larger from a boundary between tapered part 661$d$ and small-diameter part 66$a$ of metallic inner cover 661 toward an end part of tapered part 661$d$.

Further, in the present exemplary embodiment, in addition to this tapered part 661$d$, coil assembly 642 has insulator 632T different from insulator 63T of the third exemplary embodiment.

That is, as shown in FIG. 23, insulator 632T on one side has tapered parts 632$g$, each of which is insulator-side tapered parts protruding, in a tapered shape on the inner peripheral side of positioning protrusion 631$f$, along shaft direction X from positioning parts 63$e$ toward stator core 61. Metallic inner cover 661 further has tapered part 661$d$, and the tapered part 661$d$ is a cover-side tapered part spreading out, on the end part of small-diameter part 66$a$, toward the outer peripheral side.

That is, as shown in the drawing, coil assembly 642 in the present exemplary embodiment, insulator 63B similar to the insulator in the third exemplary embodiment is disposed on the opposite output shaft side; however, on the output shaft side, on which second bracket 65 is disposed, insulator 632T is disposed. Insulator 632T further has tapered parts 632$g$ as insulator-side tapered parts in addition to bottom surface part 63$a$, outer peripheral wall 63$b$, inner peripheral wall 63$c$, positioning parts 63$e$, and positioning protrusions 631$f$ similar to those in the fourth exemplary embodiment. On the output shaft side, when insulator 632T is attached to stator core 61, tapered parts 632$g$ are disposed to extend from positioning parts 63$e$ toward stator core 61 and to be located on the outer peripheral surface of stator core 61, as shown in FIG. 23. Tapered part 632$g$ has a triangular cross-section and has an inverse tapered shape as a whole, and a diameter of tapered part 632$g$ becomes larger toward an end part of stator core 61. Further, tapered part 632$g$ is formed to have approximately the same side surface angle and length in shaft direction X as tapered part 661$d$ of metallic inner cover 661.

Therefore, metallic inner cover 661 having above-mentioned tapered part 661$d$ is being fit on coil assembly 642 having tapered parts 632$g$ as described above. Then, when tapered part 661$d$ has come into contact with tapered parts 632$g$, tapered part 661$d$ functions as a stopper, and tapered part 661$d$ cannot be fit on any further. Further, when metallic inner cover 661 has been fully fit on as shown in FIG. 23, tapered part 661$d$ is disposed between tapered parts 632$g$ and positioning protrusions 631$f$ of insulator 632T in radial direction Y.

As described above, in the present exemplary embodiment, in addition to positioning parts 63$e$ and positioning protrusions 631$f$, tapered part 661$d$ and tapered parts 632$g$ restrict the position, in shaft direction X, of metallic inner cover 661 with respect to coil assembly 642.

As described above, in the present exemplary embodiment, coil assembly 642 includes insulator 632T having tapered parts 632$g$, and metallic inner cover 661 includes tapered part 661$d$ whose shape coincides with the shapes of tapered parts 632$g$. Therefore, in the present exemplary embodiment, metallic inner cover 661 can be easily fit on coil assembly 642. In particular, since such a tapered shape realizes a stopper function, it is easier to fit metallic inner cover 661 on. In addition, by such a simple operation of fitting metallic inner cover 661 on until tapered part 661$d$ and tapered parts 632$g$ come into contact with each other, coil assembly 642 and metallic inner cover 661 can be accurately aligned with each other in shaft direction X without error in positional relationship. Large-diameter part 66$b$ of metallic inner cover 661 can therefore be disposed accurately around insulators 63B, coil ends 62$a$B, and transition wires 62$b$B located on the opposite output shaft side. As a result, with the present exemplary embodiment, since large-diameter part 66$b$ of metallic inner cover 661 as a non-combustible layer can be more accurately disposed, fire and smoke can be more surely prevented from coming outside motor 106.

Although, in the above exemplary embodiments, the metallic inner cover and the metallic outer cover, which are metal members made of metal, are described as a fire countermeasure, the metallic inner cover and the metallic outer cover only have to be made of a non-combustible material. The metallic inner cover and the metallic outer cover may be made of a material other than metal such as ceramic, which is a non-combustible material.

The present invention can be widely used in a field of a so-called molded motor in which a stator is covered with molding resin.

The invention claimed is:

1. A molded motor comprising: a rotor including a rotary shaft extending in a shaft center direction, and a rotary body that has a permanent magnet and is fixed to the rotary shaft; a stator disposed to face the rotor, the stator including a stator core that a plurality of salient poles are formed on, and a plurality of coils each wound on each of the salient poles of the stator core via an insulator; a pair of shaft bearings that rotatably support the rotor; and a molding resin covering the stator, wherein the rotary body has a dielectric layer formed between the rotary shaft and an outer peripheral surface of the rotary body, each of the coils has coil ends protruding, from the stator core, on both sides in the shaft center direction, and a metal member is provided on an outer peripheral side of the coil ends and on at least a part facing the coil ends, over a circumferential direction, wherein the metal member is disposed, in the molding resin, as a metallic inner cover, and the metal member has a large-diameter part that faces coil ends on a first side of the coil ends protruding on the both sides in the shaft center direction in such a manner that the large-diameter part surrounds, over the circumferential direction, the coil ends on the first side, and a small-diameter part that has a smaller inner diameter than the large-diameter part and faces the stator core in such a manner that the small-diameter part surrounds, over the circumferential direction, the outer peripheral surface of the stator core.

2. The molded motor according to claim 1, wherein the metal member is located on an outer peripheral surface of the molding resin and on at least the part facing the coil ends.

3. The molded motor according to claim 1, wherein the metal member is located in the molding resin and on at least the part facing the coil ends.

4. The molded motor according to claim 1, wherein the metal member is made of metal members that are formed separately from each other and are each formed in a belt shape.

5. The molded motor according to claim 1, wherein
shaft direction end faces, of the molding resin, located in the shaft center direction are exposed outside, and
the metal member extends, on the shaft direction end face of the molding resin, to the part facing the coil end.

6. The molded motor according to claim 1, wherein the molding resin is formed in such a manner that a thickness, of the molding resin, in a radial direction perpendicular to the shaft center direction is thinner than a thickness, of the molding resin, in the shaft center direction.

7. The molded motor according to claim 1, wherein capacitance of the dielectric layer is adjusted in such a manner that impedance on a side of the rotor is made close to impedance on a side of the stator.

8. The molded motor according to claim 1, further comprising a metallic outer cover that is a metal member, wherein the metallic outer cover is attached to an outer surface of the molding resin in such a manner that the metallic outer cover surrounds, over at least the circumferential direction, coil ends on a second side of the coil ends protruding on the both sides in the shaft center direction.

9. The molded motor according to claim 1, further comprising a metal bracket that fixes one shaft bearing of the pair of shaft bearings, wherein the metal bracket is electrically connected to the stator core through a conductive member.

10. The molded motor according to claim 9, wherein the conductive member is buried in the molding resin.

11. The molded motor according to claim 1, further comprising a metal bracket that fixes one shaft bearing of the pair of shaft bearings, wherein the metal bracket is electrically connected to the stator core through a conductive member including an electric wire passing through between the stator core and the metal inner cover.

12. The molded motor according to claim 11, further comprising, between the stator core and the metallic inner cover, a gap part that is a gap where the electric wire is disposed.

13. The molded motor according to claim 1, further comprising a pair of metal brackets that fix the pair of shaft bearings, wherein the pair of metal bracket are electrically connected to each other through a conductive member.

14. The molded motor according to claim 13, wherein the conductive member is buried in the molding resin.

15. The molded motor according to claim 13, wherein the conductive member is located on the outer peripheral surface of the molding resin.

16. The molded motor according to claim 1, further comprising a pair of metal brackets that fix the pair of shaft bearings, wherein the pair of metal brackets are electrically connected to each other through a conductive member including an electric wire passing through between the stator core and the metal inner cover.

17. The molded motor according to claim 16, further comprising, between the stator core and the metallic inner cover, a gap part that is a gap where the electric wire is disposed.

18. The molded motor according to claim 17, wherein the gap part is a protruding part protruding from a surface of the metallic inner cover in an outer peripheral direction.

19. The molded motor according to claim 17, wherein the gap part is a groove part formed in the stator core.

20. The molded motor according to claim 1, wherein
a plurality of the insulators are disposed on both sides, of the salient poles formed on the stator core, in the shaft center direction,
each of the insulators has
a bottom surface part attached to the stator core,
an outer peripheral wall constituting a wall on an outer peripheral side, and
an inner peripheral wall constituting a wall on an inner peripheral side, and
insulators on a first side of the insulators disposed on the both sides in the shaft center direction each have a positioning part that protrudes farther in an outer peripheral direction than the outer peripheral wall and is in contact with an end part of the small-diameter part of the metallic inner cover.

21. The molded motor according to claim 20, wherein insulators on a second side of the insulators disposed on the both sides in the shaft center direction each further have a pin mounting part that a pin to be used as an electric connection terminal is attached to.

22. The molded motor according to claim 20, wherein the insulators on the first side each further have a positioning protrusion that protrudes, along the shaft center direction, from the positioning part toward the stator core.

23. The molded motor according to claim 22, wherein on an outer peripheral surface of each of the insulators on the first side, there are provided a plurality of the positioning protrusions at a predetermined interval in a circumferential direction.

24. The molded motor according to claim 22, wherein
the insulators on the first side each have an insulator-side tapered part that protrudes, on an inner peripheral side of the positioning protrusion, in a tapered shape from the positioning part toward the stator core along the shaft center direction, and
the metallic inner cover further has, on the end part of the small-diameter part, a cover-side tapered part that spreads out in a tapered shape toward an outer peripheral side.

25. The molded motor according to claim 1, further comprising a terminal cap that positions a pin to be used as an electric connection terminal, wherein the terminal cap is disposed in contact with an end part of the large-diameter part of the metallic inner cover.

26. The molded motor according to claim 25, wherein the terminal cap has
a terminal board that is disposed to face an end face of the stator core and that the pin is attached to,
a side wall that extends, along the shaft center direction, toward the stator core from an outer peripheral side of the terminal board, and
a cap protrusion that protrudes farther in an outer peripheral direction from an outer periphery of the terminal board.

27. The molded motor according to claim 26, wherein the cap protrusion is disposed in contact with an annular end part of the large-diameter part of the metallic inner cover.

28. The molded motor according to claim 26, wherein the cap protrusion further has a shaft protrusion that protrudes, along the side wall, from an outer peripheral side of the cap protrusion toward the stator core.

29. The molded motor according to claim 28, wherein on an outer peripheral surface of the terminal cap, there are provided a plurality of the shaft protrusions at a predetermined interval in a circumferential direction.

* * * * *